United States Patent
Kim et al.

(10) Patent No.: US 9,927,665 B2
(45) Date of Patent: Mar. 27, 2018

(54) LIQUID CRYSTAL DISPLAY

(71) Applicant: Samsung Display Co. Ltd., Yongin (KR)

(72) Inventors: Ka Eun Kim, Yongin-si (KR); Ki Chul Shin, Seongnam-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 63 days.

(21) Appl. No.: 14/951,107

(22) Filed: Nov. 24, 2015

(65) Prior Publication Data
US 2017/0003554 A1    Jan. 5, 2017

(30) Foreign Application Priority Data
Jul. 1, 2015 (KR) .......................... 10-2015-0093907

(51) Int. Cl.
G02F 1/1343 (2006.01)
G02F 1/1362 (2006.01)

(52) U.S. Cl.
CPC .. *G02F 1/134309* (2013.01); *G02F 1/136286* (2013.01)

(58) Field of Classification Search
CPC ................................................ G02F 1/134309
See application file for complete search history.

(56) References Cited

U.S. PATENT DOCUMENTS

| | | | |
|---|---|---|---|
| 6,867,549 B2 | 3/2005 | Cok et al. | |
| 8,110,978 B2 | 2/2012 | Fukuda | |
| 2015/0261046 A1* | 9/2015 | Miki | G02F 1/134309 349/42 |
| 2016/0097950 A1* | 4/2016 | Chang | G02F 1/133512 349/43 |

FOREIGN PATENT DOCUMENTS

| | | |
|---|---|---|
| KR | 1020110130177 | 12/2011 |
| KR | 1020140086509 | 7/2014 |
| KR | 1020150016462 | 2/2015 |

* cited by examiner

*Primary Examiner* — Edmond Lau
(74) *Attorney, Agent, or Firm* — Cantor Colburn LLP

(57) ABSTRACT

A liquid crystal display is divided into a first region and a second region by a virtual central line that passes through a central point of the LCD and extends along a first direction, where the first region comprises a plurality of dots, each comprising a first pixel, a second pixel and a third pixel displaying different colors, wherein the plurality of dots are repeatedly arranged along a second direction intersecting the first direction and comprise a first dot and a second dot, wherein a first distance between the first pixel of the first dot and the central line is greater than a second distance between the first pixel of the second dot and the central line, and the area of the first pixel of the first dot is less than that of the first pixel of the second dot.

20 Claims, 21 Drawing Sheets

LIQUID CRYSTAL DISPLAY

This application claims priority to Korean Patent Application No. 10-2015-0093907 filed on Jul. 1, 2015, and all the benefits accruing therefrom under 35 U.S.C. § 119, the content of which in its entirety is incorporated herein by reference.

BACKGROUND

1. Field

The invention relates to a liquid crystal display ("LCD").

2. Description of the Related Art

Liquid crystal displays ("LCDs") are one of the most widely used types of flat panel displays. Generally, an LCD includes field generating electrodes such as pixel electrodes and a common electrode and a liquid crystal layer interposed between the two electrodes.

The LCD generates an electric field in the liquid crystal layer by applying voltages to the field generating electrodes. Accordingly, the alignment direction of liquid crystals of the liquid crystal layer is determined, and polarization of incident light is controlled. As a result, an image is displayed on the LCD.

With the increasing use of an LCD as a display of a television receiver, the screen of the LCD is becoming larger in size. The increased size of the LCD may increase a difference in a viewing angle between a front view and a lateral view of the screen.

To compensate for the difference in viewing angle, a curved LCD such as a concave LCD or a convex LCD may be provided. From the viewpoint of a viewer, the curved LCD may be a portrait type that is longer in a vertical direction than in a horizontal direction and is curved in the vertical direction, or may be a landscape type which is shorter in the vertical direction than in the horizontal direction and is curved in the horizontal direction.

SUMMARY

A curved liquid crystal display ("LCD") or a flexible LCD may have a reddish phenomenon in which the edge of the screen looks reddish to a viewer.

Exemplary embodiments of the invention provide an LCD having a reduced reddish phenomenon.

However, exemplary embodiments of the invention are not restricted to the one set forth herein. The above and other exemplary embodiments of the invention will become more apparent to one of ordinary skill in the art to which the invention pertains by referencing the detailed description of the invention given below.

According to an exemplary embodiment of the invention, there is provided a liquid crystal display ("LCD"). The LCD is divided into a first region and a second region by a virtual central line that passes through a central point of the LCD and extends along a first direction, wherein the first region comprises a plurality of dots, each comprising a first pixel, a second pixel and a third pixel displaying different colors, wherein the dots are repeatedly arranged along a second direction intersecting the first direction and comprise a first dot and a second dot, wherein a first distance between the first pixel of the first dot and the central line is greater than a second distance between the first pixel of the second dot and the central line, and the area of the first pixel of the first dot is less than that of the first pixel of the second dot.

In an exemplary embodiment, a maximum value of the first distance may be two third of a length of the first region in the second direction.

In an exemplary embodiment, a minimum value of the first distance may be two thirds of the length of the first region in the second direction.

In an exemplary embodiment, a maximum value of the second distance may be two thirds of the length of the first region in the second direction.

In an exemplary embodiment, the area of the first dot may be equal to that of the second dot.

In an exemplary embodiment, a length of the first pixel of the first dot in the first direction may be equal to a length of the first pixel of the second dot in the first direction.

In an exemplary embodiment, a ratio of the area of the first pixel of the first dot and the area of the second pixel of the first dot may range from 1:2 to less than 1:1.

In an exemplary embodiment, the area of the second pixel of the first dot may be equal to that of the third pixel of the first dot.

In an exemplary embodiment, a ratio of the area of the first pixel of the first dot and the area of the first pixel of the second dot may range from 3:5 to less than 1:1.

In an exemplary embodiment, a color displayed by the first pixel may have a longer wavelength than a color displayed by the second pixel, and the color displayed by the second pixel may have a longer wavelength than a color displayed by the third pixel.

In an exemplary embodiment, each of the dots repeatedly arranged along the second direction may comprise three pixels as a basic unit, wherein the basic unit sequentially may comprise a red pixel displaying red, a green pixel displaying green and a blue pixel displaying blue or a red pixel displaying red, a blue pixel displaying blue and a green pixel displaying green.

In an exemplary embodiment, the LCD may be curved or flexible.

According to another exemplary embodiment of the invention, there is provided a liquid crystal display ("LCD"). The LCD includes a first substrate, a second substrate which faces the first substrate, and a plurality of data lines which are disposed on the first substrate and extend along a first direction, wherein the LCD is divided into a first region and a second region by a virtual central line that passes through a central point of the LCD and extends along the first direction, and at least a portion of the data lines are provided in the first region, wherein the data lines provided in the first region comprise a first data line, a second data line and a third data line sequentially adjacent to each other as a basic unit, and the basic unit is repeated along a second direction intersecting the first direction, wherein the basic units comprise a first basic unit and a second basic unit, wherein a first distance between the first data line of the first basic unit and the central line is greater than a second distance between the first data line of the second basic unit and the central line, and a distance between the first data line of the first basic unit and the second data line of the first basic unit is smaller than a distance between the first data line of the second basic unit and the second data line of the second basic unit.

In an exemplary embodiment, a maximum value of the first distance may be two thirds of a length of the first region in the second direction.

In an exemplary embodiment, a minimum value of the first distance may be two thirds of the length of the first region in the second direction.

In an exemplary embodiment, a maximum value of the second distance may be two thirds of the length of the first region in the second direction.

In an exemplary embodiment, a ratio of the distance between the first data line of the first basic unit and the second data line of the first basic unit and a distance between the second data line of the first basic unit and the third data line of the first basic unit may range from 1:2 to less than 1:1.

In an exemplary embodiment, a ratio of the distance between the first data line of the first basic unit and the second data line of the first basic unit and the distance between the first data line of the second basic unit and the second data line of the second basic unit may range from 3:5 to less than 1:1.

In an exemplary embodiment, the first data line of each basic unit may be electrically connected to a red pixel displaying red.

In an exemplary embodiment, the second data line of each basic unit may be electrically connected to a red pixel displaying red.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
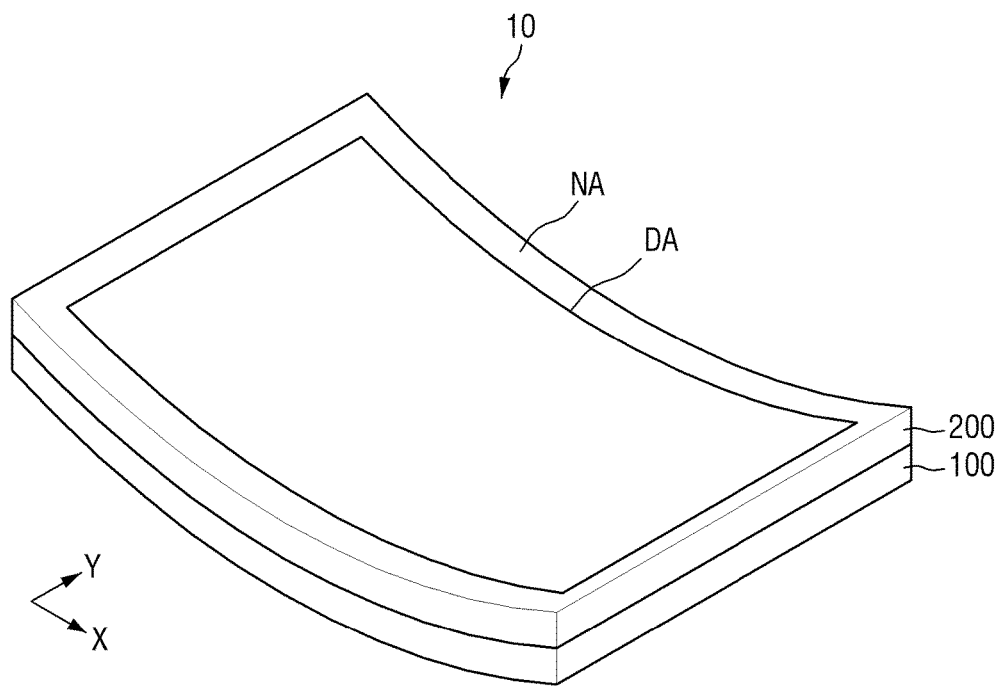
FIG. 1 is a perspective view of a liquid crystal display ("LCD")

Features of the invention and methods of accomplishing the same may be understood more readily by reference to the following detailed description of preferred embodiments and the accompanying drawings.

The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the attached drawings.

Figure 2:
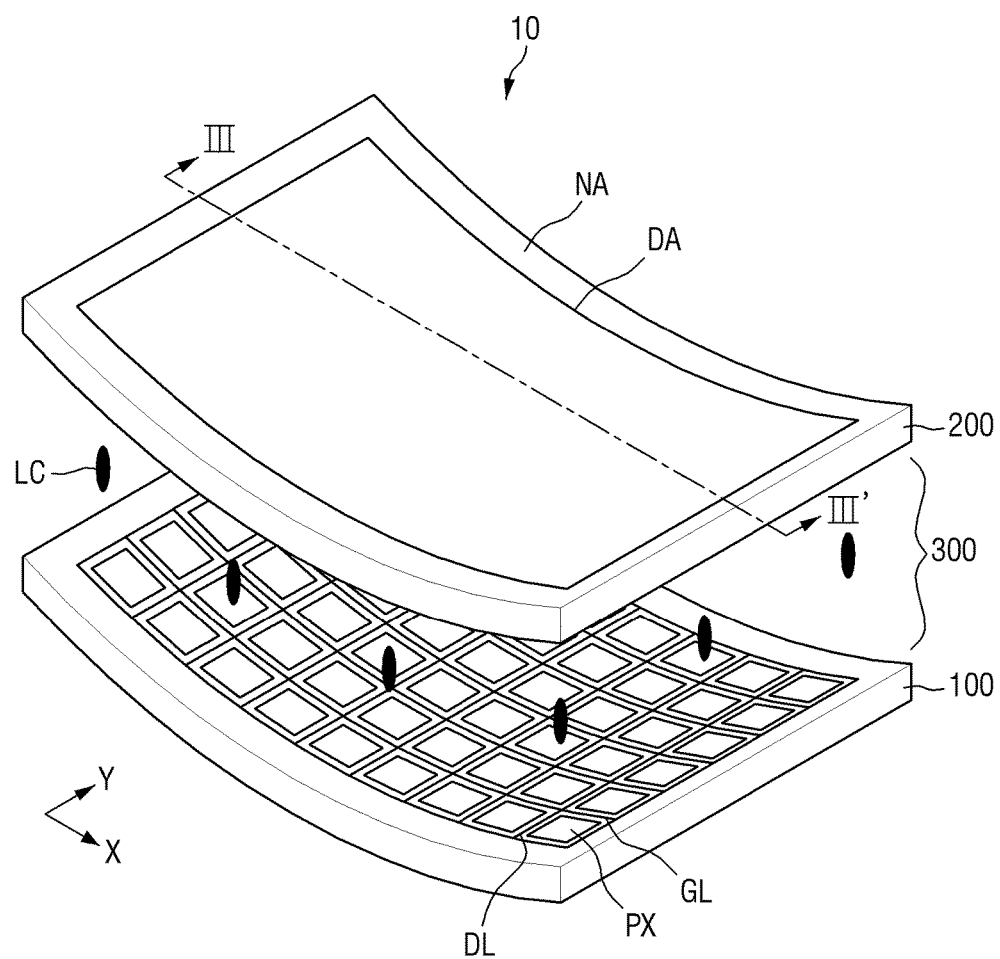
FIG. 2 is a schematic exploded perspective view of the LCD of FIG. 1.

FIG. 1 is a perspective view of a liquid crystal display ("LCD") 10. FIG. 2 is a schematic exploded perspective view of the LCD 10 of FIG. 1.

Referring to FIGS. 1 and 2, the LCD 10 includes a first substrate 100, a second substrate 200 separated from the first substrate 100 and facing the first substrate 100, and a liquid crystal layer 300 interposed between the first substrate 100 and the second substrate 200. In an exemplary embodiment, each of the first and second substrates 100 and 200 is a transparent or opaque insulating substrate such as a silicon substrate, a glass substrate, or a plastic substrate.

Each of the first substrate 100 and the second substrate 200 includes a display area DA and a non-display area NA. The display area DA is a portion where images are displayed, and the non-display area NA is a portion where no images are displayed. The display area DA is surrounded by the non-display area NA.

The non-display area NA may be a light-blocking area. A driver (not illustrated) providing gate driving signals, data driving signals, etc. to pixels PX of the display area DA may be disposed in the non-display area NA of the first substrate 100. Gate lines GL and data lines DL may extend from the display area DA to the non-display area NA and may be electrically connected to the driver (not illustrated).

A first alignment layer (not illustrated) is disposed on an upper surface of the first substrate 100, and a second alignment layer (not illustrated) may be disposed on a lower surface of the second substrate 200. The liquid crystal layer 300 may be interposed between the first alignment layer and the second alignment layer. In an exemplary embodiment, the liquid crystal layer 300 may include liquid crystal molecules LC having negative dielectric anisotropy, for example. However, the invention is not limited thereto, and the liquid crystal layer 300 may also include liquid crystal molecules having positive dielectric anisotropy.

Herein, a horizontal direction of the LCD 10 will be referred to as a first direction X, and a vertical direction thereof will be referred to as a second direction Y. As illustrated in FIGS. 1 and 2, the LCD 10 may be a curved LCD that is curved along the first direction X on a plane.

Figure 3:
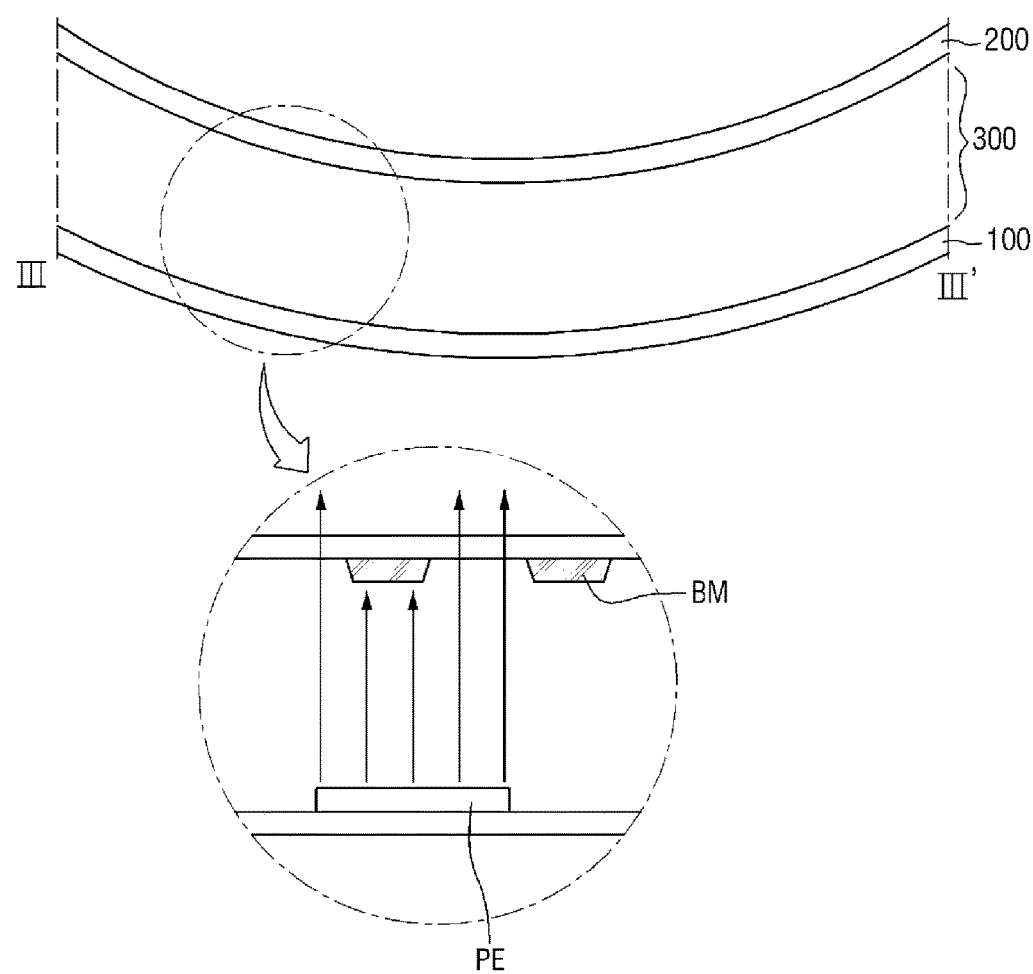
FIG. 3 is a cross-sectional view of the LCD of FIG. 2, taken along line III-III'.

FIG. 3 is a cross-sectional view of the LCD of FIG. 2, taken along line III-III'.

Referring to FIG. 3, in the curved LCD, relative positions of the first substrate 100 and the second substrate 200 in each pixel may be changed. In an exemplary embodiment, the second substrate 200 may be shifted to the left or right with respect to the first substrate 100 at a certain location. This may cause misalignment in each pixel. Accordingly, a pixel region in which a pixel electrode PE of the first substrate 100 is provided may be partially overlapped by a blocking member BM of the second substrate 200 in the vertical direction. In other words, misalignment may be caused by the curvature of the curved LCD. In a region in which the misalignment occurs, display quality of an image may be poorer in the curved LCD than in a flat LCD.

Due to the shift of the second substrate 200, a part of a pixel region of the first substrate 100 which is not overlapped by a pixel region of the second substrate 200 may be hidden by the blocking member BM. This not only reduces luminance but also poses a risk of color mixing in this part. This phenomenon may become worse toward both side edges of the curved LCD. In an exemplary embodiment, a sharp reduction in luminance is observed at a location corresponding to one sixth of a side of the curved LCD in the first direction X from a central part of the curved LCD and at a location corresponding to one sixth of the other side of the curved LCD in the first direction X from the central part of the curved LCD. This will now be described in more detail.

Figure 4:
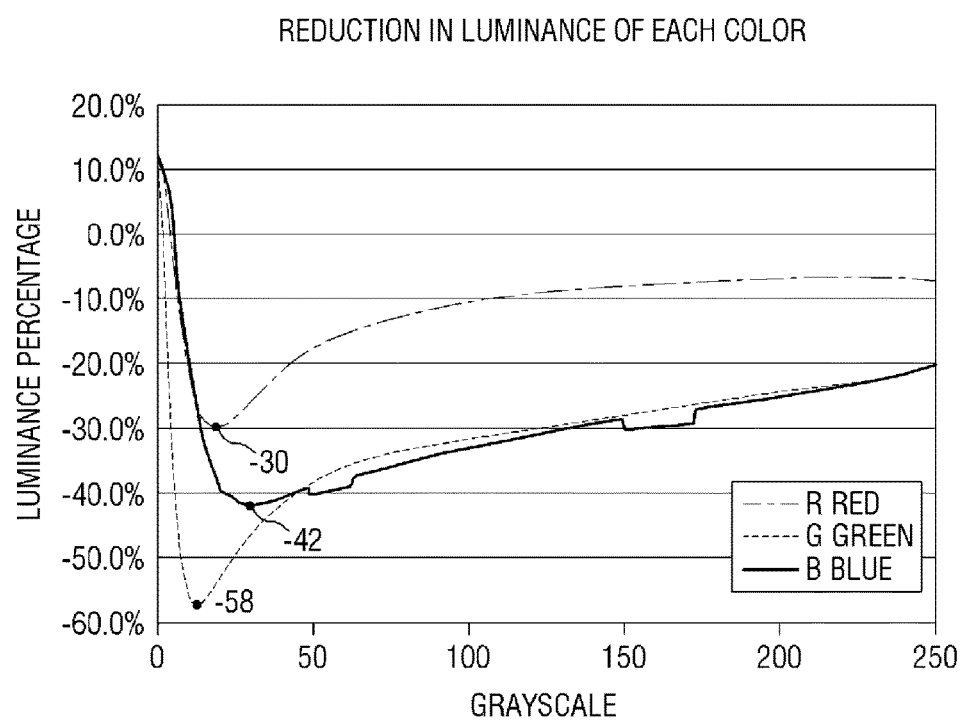
FIG. 4 is a graph illustrating a reduction in luminance of each color in a misalignment region of FIG. 3.

FIG. 4 is a graph illustrating a reduction in luminance of each color in the misalignment region of FIG. 3.

Referring to FIG. 4, at a location where the misalignment is at a maximum, the curved LCD experiences a reduction in absolute luminance over the entire grayscale range. In particular, a reduction in luminance is greater in a low grayscale range than in a high grayscale range.

Specifically, referring to a trend in a reduction in luminance of each color, a reduction in luminance of red gradually increases as a gray level increases in a grayscale range of 0 to approximately 20. In an exemplary embodiment, the reduction in luminance of red is largest, i.e., approximately 30% at a gray level of approximately 20, for example. Then, as the gray level increases, the reduction in luminance of red decreases to reach approximately 8% at a gray level of 255, for example.

In an exemplary embodiment, a reduction in luminance of green gradually increases as the gray level increases in a grayscale range of 0 to approximately 15, for example. The reduction in luminance of green is largest, i.e., approximately 58% at a gray level of approximately 15, for example. Then, as the gray level increases, the reduction in luminance of green decreases to reach approximately 20% at a gray level of 255, for example.

In addition, a reduction in luminance of blue gradually increases as the gray level increases in a grayscale range of 0 to approximately 25, for example. The reduction in luminance of blue is largest, i.e., approximately 42% at a gray level of approximately 25, for example. Then, as the gray level increases, the reduction in luminance of blue decreases to reach approximately 21% at a gray level of 255, for example.

That is, although there is a difference between the low grayscale range and the high grayscale range, the reduction in luminance of each of red and blue is approximately 1.4 to 2.5 times the reduction in luminance of red over the entire grayscale range, for example. Unlike a flat LCD that may display an initially intended color by combining red, green and blue without a reduction in the luminance of each color, the curved LCD may display a color that includes more red than an initially intended color does when displaying the same color as the flat LCD because the reduction in luminance of red is less than the reduction in luminance of each of green and blue. Therefore, the color displayed on the curved LCD may be perceived by viewers as reddish. That is, a reddish phenomenon may occur.

To reduce the reddish phenomenon that may occur in the curved LCD due to a different reduction in luminance of each color caused by the misalignment, the structure of an LCD according to an exemplary embodiment of the invention will now be described in detail.

Figure 5:
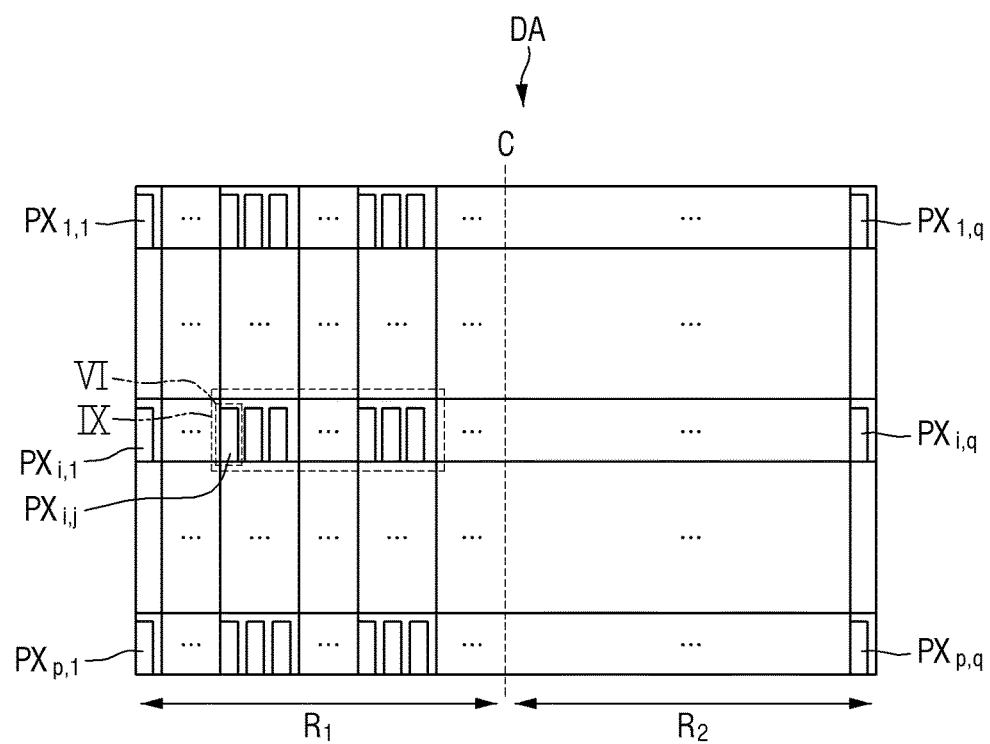
FIG. 5 is a schematic block diagram of an exemplary embodiment of a display area of an LCD according to the invention.

FIG. 5 is a schematic block diagram of a display area DA of an LCD 10 according to an exemplary embodiment of the invention.

Referring to FIGS. 2 and 5, the display area DA according to the current embodiment includes a plurality of gate lines GL, a plurality of data lines DL which are insulated from the gate lines GL and intersect the gate lines GL, and a plurality of pixels $PX_{1,1}$ through $PX_{p,q}$ which are provided at intersections of the gate lines GL and the data lines DL. The pixels $PX_{1,1}$ through $PX_{p,q}$ may be arranged in a matrix along the first direction X and the second direction Y. Here, p and q are integers greater than zero.

The pixels $PX_{1,1}$ through $PX_{p,q}$ are connected to corresponding gate lines GL and corresponding data lines DL. The gate lines GL and the data lines DL may receive control signals from an external driver circuit (not illustrated). Specifically, one pixel $P_{i,j}$ is connected to one gate line and one data line and receives a data voltage from the data line in response to a gate signal provided through the gate line. Here, i and j are integers greater than zero and less than p and q.

The display area DA may be divided into a first region $R_1$ and a second region $R_2$ by a central line C that passes through a central point of the LCD 10 and extends along the second direction Y. The central point of the LCD 10 denotes an intersection point of a line that bisects the LCD 10 horizontally and a line that bisects the LCD 10 vertically.

In an exemplary embodiment, the first region $R_1$ and the second region $R_2$ may be a left half plane and a right half plane of a landscape-type LCD, respectively, for example. In other exemplary embodiments, the first region $R_1$ and the second region $R_2$ may be an upper half plane and a lower half plane of a portrait-type LCD, respectively, for example. Hereinafter, one pixel $P_{i,j}$ in the first region $R_1$ (left half plane) will be described in more detail.

Figure 6:
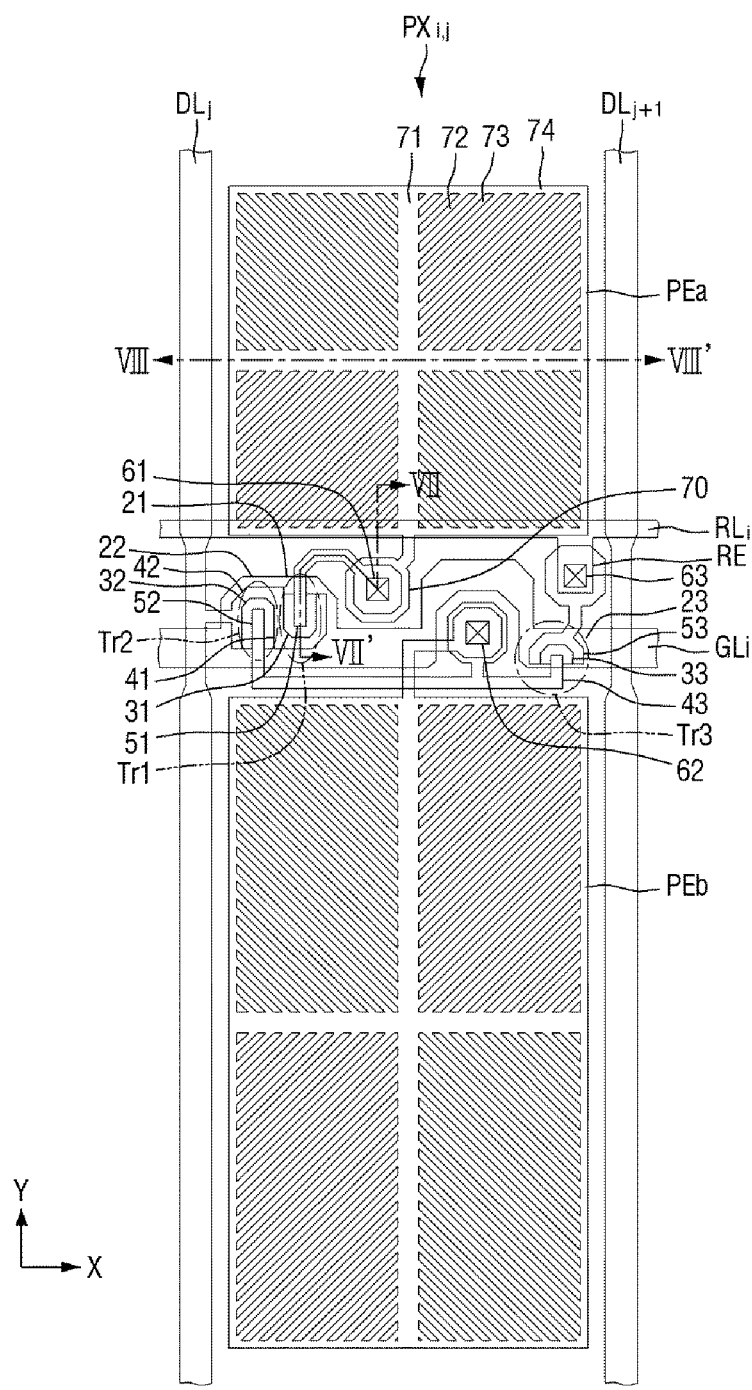
FIG. 6 is an enlarged plan view of a region 'VI' of FIG. 5.
Figure 7:
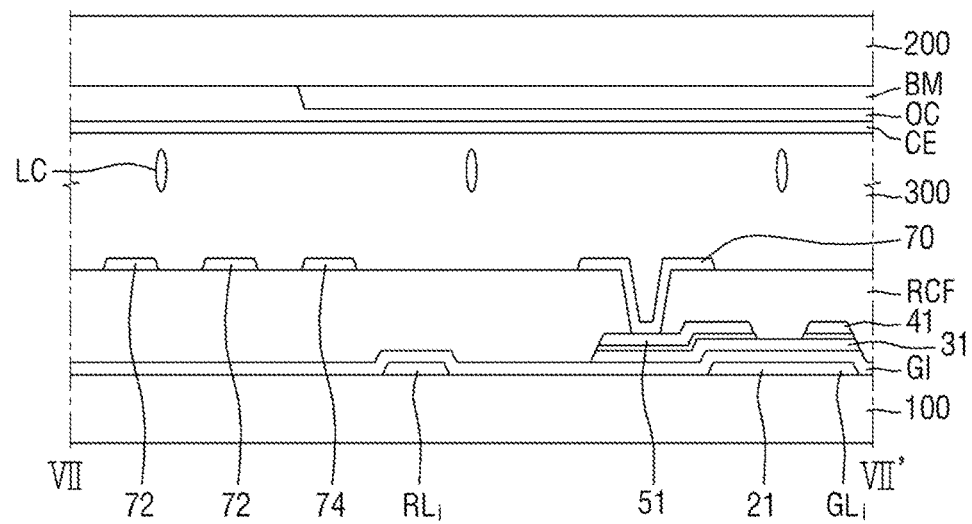
FIG. 7 is a cross-sectional view taken along line VII-VII' of FIG. 6.
Figure 8:
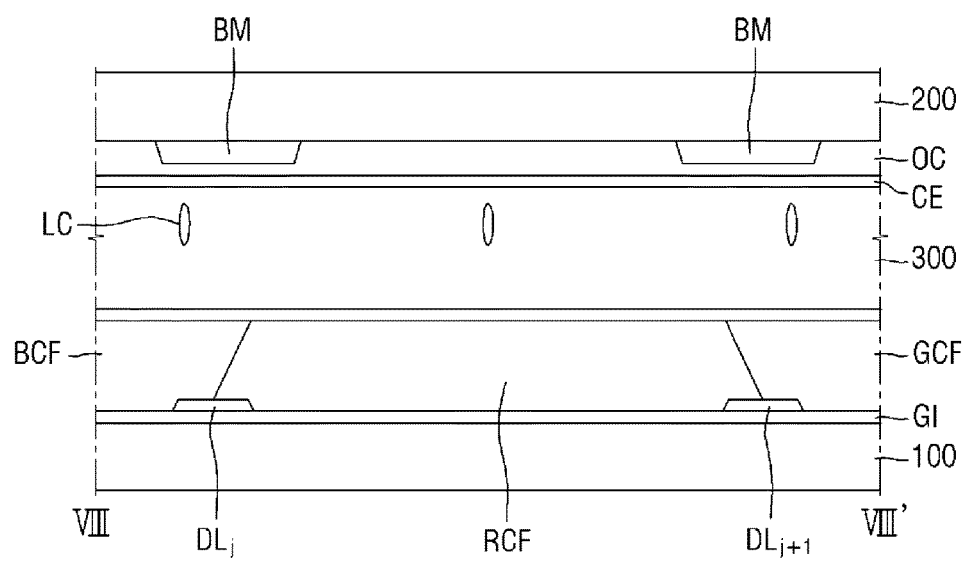
FIG. 8 is a cross-sectional view taken along line VIII-VIII' of FIG. 6.

FIG. 6 is an enlarged plan view of a region 'VI' of FIG. 5. FIG. 7 is a cross-sectional view taken along line VII-VII' of FIG. 6. FIG. 8 is a cross-sectional view taken along line VIII-VIII' of FIG. 6.

For the sake of simplicity, the configuration of only one pixel $PX_{i,j}$ will be described. However, other pixels may also have the same configuration as the pixel $PX_{i,j}$.

Referring to FIGS. 5 through 8, a gate line $GL_i$ is disposed on a first substrate 100 and extends along roughly the first direction X. The gate line $GL_i$ delivers a gate signal.

A first gate electrode 21 and a second gate electrode 22 may protrude from the gate line $GL_i$ and may be connected to each other. The first gate electrode 21 and the second gate electrode 22 may protrude upward from the gate line $GL_i$, and the first gate electrode 21 may be located on the right side of the second gate electrode 22.

In addition, a third gate electrode 23 is provided in a region that overlaps the gate line $GL_i$. That is, the first through third gate electrodes 21 through 23 are electrically connected to the same gate line $GL_i$, and the same gate signal may be transmitted to the first through third gate electrodes 21 through 23.

A voltage dividing electrode line $RL_i$ is disposed on the same layer as the gate line $GL_i$ and extends substantially parallel to the gate line $GL_i$. A predetermined voltage such as a common voltage may be applied to the voltage dividing electrode line $RL_i$.

A voltage dividing electrode RE protrudes from the voltage dividing electrode line $RL_i$. The voltage dividing electrode RE protrudes downward from the voltage dividing electrode line $RL_i$ and has a wide surface. The voltage dividing electrode line $RL_i$ and the voltage dividing electrode RE divide a voltage charged in a second subpixel electrode PEb through a third thin-film transistor ("TFT") Tr3, such that a first subpixel electrode PEa and the second subpixel electrode PEb are charged with different voltages.

The voltage electrode line $RL_i$ may further include branch lines (not illustrated) extending toward first and second data lines $DL_j$ and $DL_{j+1}$. The voltage dividing electrode line $RL_i$ may be omitted, and the shape and position of the voltage dividing electrode line $RL_i$ may be changed variously.

A gate insulating layer GI is disposed directly on the gate line $GL_i$ and the voltage dividing electrode line $RL_i$ to cover the whole of the substrate 100 and the gate line $GL_i$. The gate insulating layer GI may include an insulating material to electrically insulate a layer located thereon from a layer located thereunder. Examples of the material that forms the gate insulating layer GI may include silicon nitride ($SiN_x$), silicon oxide (SiOx), silicon oxynitride (SiOxNy), and silicon nitride oxide (SiNxOy).

First through third semiconductor layers 31 through 33 and the first and second data lines $DL_j$ and $DL_{j+1}$ are disposed on the gate insulating layer GI. First through third source electrodes 41 through 43 and first through third drain electrodes 51 through 53 are disposed on the first through third semiconductor layers 31 through 33.

The first data line $DL_j$ and the second data line $DL_{j+1}$ extend parallel to each other along roughly the second direction Y and intersect the gate line $GL_i$. The first and second data lines $DL_j$ and $DL_{j+1}$ deliver data signals.

The first semiconductor layer 31 overlaps the first electrode 21, the second semiconductor layer 32 overlaps the second gate electrode 22, and the third semiconductor layer 33 overlaps the third gate electrode 23. Each of the first through third semiconductor layers 31 through 33 may serve as a channel of a TFT.

The first source electrode 41 and the second source electrode 42 which are connected to each other may protrude from the first data line DLj toward the first and second gate electrodes 21 and 22. In an exemplary embodiment, each of the first and second source electrodes 41 and 42 may be bent in a 'U' shape, for example. The third source electrode 43 will be described later.

The first drain electrode 51 is disposed on the first gate electrode 21 and the first semiconductor layer 31 and separated from the first source electrode 41. Likewise, the second drain electrode 52 is disposed on the second gate electrode 22 and the second semiconductor layer 32 and separated from the second source electrode 42. The first and second drain electrodes 51 and 52 may respectively be electrically connected to the first and second subpixel electrodes PEa and PEb which will be described later.

The third source electrode 43 is disposed on the third gate electrode 23 and the third semiconductor layer 33. The third source electrode 43 is electrically connected to the second drain electrode 52.

The third drain electrode 53 is disposed on the third gate electrode 23 and the third semiconductor layer 33 and separated from the third source electrode 43 and is bent in a 'U' shape, for example, to surround the third source electrode 43. In addition, the third drain electrode 53 may be electrically connected to the voltage dividing electrode RE.

A gate electrode, a semiconductor layer, a source electrode and a drain electrode described above may form a TFT which is a three-terminal switching device.

Specifically, the first gate electrode 21 which is a control terminal of a first TFT Tr1 is electrically connected to the gate line $GL_i$, the first source electrode 41 which is an input terminal of the first TFT Tr1 is electrically connected to the first data line $DL_j$, and the first drain electrode 51 which is an output terminal of the first TFT Tr1 is electrically connected to the first subpixel electrode PEa.

The second gate electrode 22 which is a control terminal of a second TFT Tr2 is electrically connected to the gate line $GL_i$, the second source electrode 42 which is an input terminal of the second TFT Tr2 is electrically connected to the first data line $DL_j$, and the second drain electrode 52 which is an output terminal of the second TFT Tr2 is electrically connected to the second subpixel electrode PEb.

The third gate electrode 23 which is a control terminal of a third TFT Tr3 is electrically connected to the gate line $GL_i$, the third source electrode 43 which is an input terminal of the third TFT Tr3 is electrically connected to the second drain electrode 52, and the third drain electrode 53 which is an output terminal of the third TFT Tr3 is electrically connected to the voltage dividing electrode RE.

A passivation layer is disposed on the whole surface of the first and second data lines $DL_j$ and $DL_{j+1}$, the gate line $GL_i$ and the first through third TFTs Tr1 through Tr3. The passivation layer may include an organic insulating material or an inorganic insulating material and composed of a single layer or multiple layers.

The organic insulating material according to an exemplary embodiment of the invention may be a color filter layer. In the illustrated embodiment, a color filter-on-array ("COA") structure in which a color filter is disposed on the first through third TFTs Tr1 through Tr3 is described as an example. In other exemplary embodiments, however, an array-on-color filter ("AOC") structure in which the color filter is disposed under the first through third TFTs Tr1 through Tr3 may be implemented. The color filter may also be disposed on the second substrate 200 which faces the first substrate 100.

The color filter may include a red filter RCF, a green filter GCF, or a blue filter BCF. In other exemplary embodiments, the color filter may include various other colors other than red, green or blue. In an exemplary embodiment, the color filter may include a magenta, cyan, yellow or black filter, for example.

Color filters of three different colors may be disposed in three adjacent pixel regions. In an exemplary embodiment, the red filter RCF may be disposed on the whole surface of a pixel electrode PE and the first through third TFTs Tr1 through Tr3 between the first data line $DL_j$ and the second data line $DL_{j+1}$ which are adjacent to each other. Here, the red filter RCF may be disposed on the first data line $DL_j$ and the second data line $DL_{j+1}$ to partially overlap the first data line $DL_j$ and the second data line $DL_{j+1}$.

Likewise, the green filter GCF may be disposed between the second data line $DL_{j4}$ and a third data line (not illustrated), and the blue filter BCF may be disposed between the third data line (not illustrated) and a fourth data line (not illustrated).

In other exemplary embodiments, another passivation may be disposed on the color filter to prevent the lifting of the color filter and reduce afterimage by suppressing the contamination of a liquid crystal layer 300 by organic matter such as a solvent introduced from the color filter.

Contact holes are disposed in the gate insulating layer GI and the color filter to partially expose the first drain electrode 51, the second drain electrode 52 and the third drain electrode 53, respectively. The first drain electrode 51 is electrically connected to the first subpixel electrode PEa by a first contact hole 61, the second drain electrode 52 is electrically connected to the second subpixel electrode PEb by a second contact hole 62, and the third drain electrode 53 is electrically connected to the voltage dividing electrode RE by a third contact hole 63.

The pixel electrode PE disposed on the color filter generates an electric field together with a common electrode CE disposed on the second substrate 200, thereby controlling the alignment direction of liquid crystal molecules LC in the liquid crystal layer 300 interposed between the pixel electrode PE and the common electrode CE. The pixel electrode PE may be a transparent electrode. Examples of the material that forms the transparent electrode may include indium tin oxide ("ITO") and indium zinc oxide ("IZO").

The pixel electrode PE may include the first and second subpixel electrodes PEa and PEb which are separated from each other. As described above, the first subpixel electrode PEa is electrically connected to the first drain electrode 51 which is the output terminal of the first TFT Tr1, and the second subpixel electrode PEb is electrically connected to the second drain electrode 52 which is the output terminal of the second TFT Tr2.

The first subpixel electrode PEa according to the current embodiment of the invention has a shape such as a quadrilateral, and has a protrusion 70 protruding downward. The first subpixel electrode PEa may be a pattern electrode having a slit pattern.

Specifically, the slit pattern of the first subpixel electrode PEa may include a stem part 71, a plurality of branches 72 extending from the stem part 71, and a plurality of slits 73 defined between the branches 72. The stem part 71 may have a shape such as a cross (+), and the branches 72 may extend in a radial pattern from the cross-shaped stem part 71 at an angle of approximately 45 degrees, for example.

That is, each of the first and second subpixel electrodes PEa and PEb includes four domains in each of which the branches 72 extend in a different direction. The domains serve as directors of the liquid crystal molecules LC and make the liquid crystal molecules LC aligned in different directions while the LCD 10 is being driven. Accordingly, this may improve control over liquid crystals, widen a viewing angle, reduce texture, and improve transmittance and response speed.

Ends of the branches 72 extending in a radial pattern are connected to each other by an edge connector 74. In addition, the protrusion 70 is disposed under the first subpixel electrode PEa to protrude downward and is electrically connected to the first drain electrode 51 by the contact hole 61.

The second subpixel electrode PEb may have a shape similar to that of the first subpixel electrode PEa. However, the second subpixel electrode PEb may be longer in the second direction Y than the first subpixel electrode PEa. A detailed description of the shape of the second subpixel electrode PEb is omitted.

The shape of each of the first and second subpixel electrodes PEa and PEb is merely one example. In other exemplary embodiments, each of the first and second subpixel electrodes PEa and PEb may be bent with respect to a gate line or a data line and may have a slit pattern including various shapes of branches and slits and a connector having various shapes.

A first alignment layer (not illustrated) may be disposed on the color filter and the pixel electrode PE.

The second substrate 200 may be a counter substrate of the first substrate 100. In addition, a blocking member BM, a planarization layer, and the common electrode CE may be disposed on the second substrate 200.

The blocking member BM may be provided at a boundary between a plurality of color filters disposed on the first substrate 100. More specifically, the blocking member BM may be disposed in a region overlapping the first and second data lines $DL_j$ and $DL_{j+1}$, the gate line $GL_i$, and the first through third TFTs Tr1 through Tr3 disposed on the first substrate 100. In an exemplary embodiment, the blocking member BM may be a black matrix, for example. Unlike the illustration in the drawings, the blocking member BM may also be disposed on the color filter of the first substrate 100.

An overcoat OC which is the planarization layer may be disposed on the second substrate 200 and the blocking member BM. The common electrode CE may be disposed on the overcoat layer OC. In an exemplary embodiment, the common electrode CE may be a patternless electrode without a slit pattern, for example. The common voltage is applied to the common electrode CE. In this case, the common electrode CE generates an electric field together with the pixel electrode PE disposed on the first substrate 100, thereby controlling the alignment direction of the liquid crystal molecules LC in the liquid crystal layer 300 interposed between the common electrode CE and the pixel electrode PE. The common electrode CE may be a transparent electrode.

In addition, a second alignment layer (not illustrated) may be disposed on the common electrode CE.

A plurality of dots in the first region $R_1$ (left half plane) will now be compared and described in detail.

Figure 9:
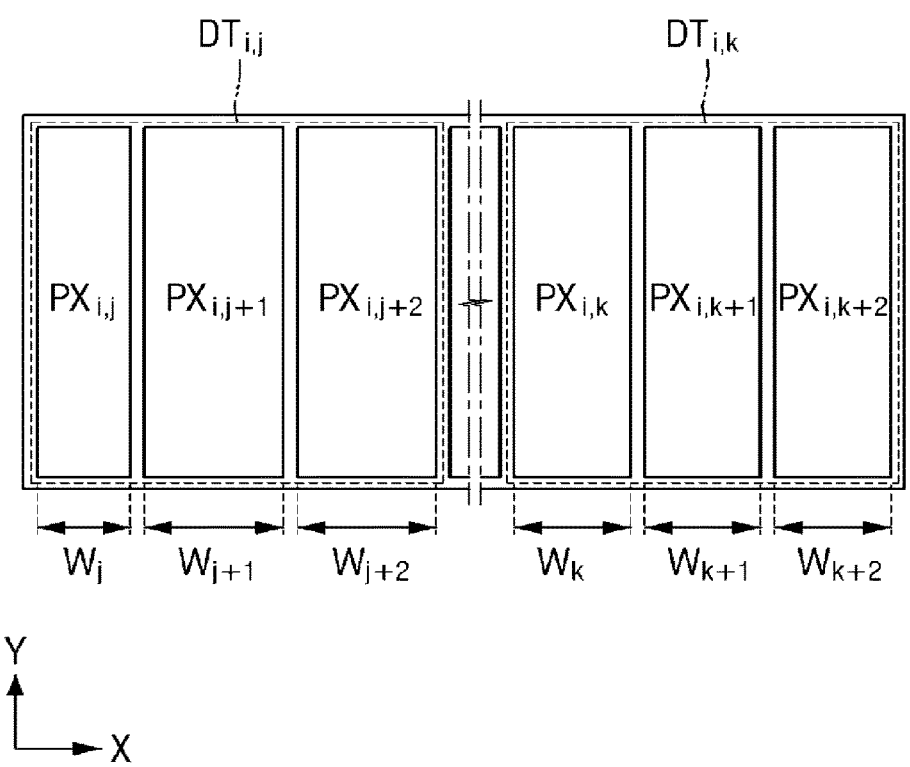
FIG. 9 is an enlarged plan view of a region 'IX' of FIG. 5.

FIG. 9 is an enlarged plan view of a region 'IX' of FIG. 5.

Referring to FIGS. 5 and 9, pixels $PX_{i,j}$ through $PX_{i,k+2}$ repeatedly arranged along the first direction X may form one row of a matrix of pixels. In this case, the pixels $PX_{i,j}$ through $PX_{i,k+2}$ repeatedly arranged along the first direction X may include three pixels displaying three different colors as a basic unit, and the basic unit may be repeated along the first direction X, for example. According to an exemplary embodiment of the invention, a red pixel ($PX_{i,j}$) displaying red, a green pixel ($PX_{i,j+1}$) displaying green and a blue pixel ($PX_{i,j+2}$) displaying blue may form a basic unit, and the basic unit may be repeated. However, the invention is not limited thereto. In an exemplary embodiment, a magenta pixel, a cyan pixel and a yellow pixel may form a basic unit, and the basic unit may be repeated, for example.

Further, pixels repeatedly arranged along the second direction Y may form one column of the matrix of pixels. In this case, the pixels repeatedly arranged along the second direction Y may be pixels displaying the same color. Therefore, the so-called stripe-type pixel arrangement may be realized.

Three adjacent pixels ($PX_{i,j}$, $PX_{i,j+1}$ and $PX_{i,j+2}$) that form a basic unit define one dot. Since primary colors displayed by three pixels combine to produce an intended color, one dot may be a basic unit perceived by viewers as a color. In addition, vertical and horizontal lengths of one dot may be substantially equal to those of another dot. A plurality of dots included in the display area DA may be made to have substantially the same area, thereby providing uniform image quality to viewers without stains.

The pixels $PX_{i,j}$ through $PX_{i,k+2}$ repeatedly arranged along the first direction X may include a first pixel $PX_{i,j}$ of a first dot $DT_{i,j}$, a second pixel $PX_{i,j+1}$ of the first dot $DT_{i,j}$, a third pixel $PX_{i,j+2}$ of the first dot $DT_{i,j}$, a first pixel $PX_{i,k}$ of a second dot $DT_{i,k}$ which displays the same color as the first pixel $PX_{i,j}$ of the first dot $DT_{i,j}$, a second pixel $PX_{i,k+1}$ of the second dot $DT_{i,k}$ which displays the same color as the second pixel $PX_{i,j+1}$ of the first dot $DT_{i,j}$, and a third pixel $PX_{i,k+2}$ of the second dot $DT_{i,k}$ which displays the same color as the third pixel $PX_{i,j+2}$ of the first dot $DT_{i,j}$. Here, i and j are integers greater than zero, and k is an integer greater than j.

A distance between the first pixel $PX_{i,j}$ of the first dot $DT_{i,j}$ and the central line C in the first direction X is greater than a distance between the first pixel $PX_{i,k}$ of the second dot $DT_{i,k}$ and the central line C in the first direction X. That is, the first pixel $PX_{i,j}$ of the first dot $DT_{i,j}$ may be located further to the central line C than the first pixel $PX_{i,k}$ of the second dot $DT_{i,k}$ in the first region $R_1$ (left half plane) of the display area DA.

If the first through third pixels $PX_{i,j}$ through $PX_{i,j+2}$ of the first dot $DT_{i,j}$ are compared with the first through third pixels $PX_{i,j}$ through $PX_{i,k+2}$ of the second dot $DT_{i,k}$, the area of the first pixel $PX_{i,j}$ of the first dot $DT_{i,j}$ is less than that of the first pixel $PX_{i,k}$ of the second dot $DT_{i,k}$ in the current embodiment. Since the area of the first dot $DT_{i,j}$ is substantially equal to that of the second dot $DT_{i,k}$, the sum of the area of the second pixel $PX_{i,j+1}$ of the first dot $DT_{i,j}$ and the area of the third pixel $PX_{i,j+2}$ of the first dot $DT_{i,j}$ is greater than the sum of the area of the second pixel $PX_{i,k+1}$ of the second dot $DT_{i,k}$ and the area of the third pixel $PX_{i,k+2}$ of the second dot $DT_{i,k}$. Herein, 'the area of a pixel' or 'the area of a dot' may denote the area of a region where light passing through a unit pixel including a pixel electrode and a color filter is viewed as substantially one color or the area of a region where the light is viewed as a plurality of colors.

Even though the area of the first pixel $PX_{i,j}$ of the first dot $DT_{i,j}$ less than that of the first pixel $PX_{i,k}$ of the second dot $DT_{i,k}$, since the area of the first dot $DT_{i,j}$ is made to be substantially equal to that of the second dot $DT_{i,k}$ by making the areas of the second and third pixels $PX_{i,j+1}$ and $PX_{i,j+2}$ of the first dot $DT_{i,j}$ greater than those of the second and third pixels $PX_{i,k+1}$ and $PX_{i,k+1}$ of the second dot $DT_{i,k}$, the same aperture ratio may be maintained, while the formation of stains is prevented.

In an exemplary embodiment, the first through third pixels $PX_{i,j}$ through $PX_{i,j+2}$ of the first dot $DT_{i,j}$ and the first through third pixels $PX_{i,k}$ through $PX_{i,k+2}$ of the second dot $DT_{i,k}$ have equal vertical lengths. However, a horizontal length $W_j$ of the first pixel $PX_{i,j}$ of the first dot $DT_{i,j}$ may be less than a horizontal length $W_k$ of the first pixel $PX_{i,k}$ of the second dot $DT_{i,k}$. In addition, the sum $(W_{j+1}+W_{j+2})$ of horizontal lengths of the second and third pixels $PX_{i,j+1}$ and $PX_{i,j+2}$ of the first dot $DT_{i,j}$ may be greater than the sum $(W_{k+1}+W_{k+2})$ of horizontal lengths of the second and third pixels $PX_{i,k+1}$ and $PX_{i,k+2}$ of the second dot $DT_{i,k}$.

If the first through third pixels $PX_{i,j}$ through $PX_{i,j+2}$ of the first dot $DT_{i,j}$ are compared with each other, the area of the first pixel $PX_{i,j}$ of the first dot $DT_{i,j}$ is less than those of the second and third pixels $PX_{i,j+1}$ and $PX_{i,j+2}$ of the first dot $DT_{i,j}$ in the current embodiment. In addition, the area of the second pixel $PX_{i,j+1}$ of the first dot $DT_{i,j}$ is substantially equal to the area of the third pixel $PX_{i,j+2}$ of the first dot $DT_{i,j}$.

By making the area of the first pixel $PX_{i,j}$ displaying red in the first dot $DT_{i,j}$ less than the areas of the second and third pixels $PX_{i,j+1}$ and $PX_{i,j+2}$ displaying green and blue in the first dot $DT_{i,j}$ as described above, it is possible to compensate for a reduction in luminance of each color due to the misalignment of liquid crystals in a curved region.

That is, as described above, a reduction in luminance of red is relatively small, and a reduction in luminance of each of green and blue is relatively great. In an exemplary embodiment, the reduction in luminance of each of green and blue is approximately 1.4 to 2.5 times the reduction in the luminance of red, for example. Therefore, the areas of pixels displaying green and blue may be increased instead of reducing the area of a pixel displaying red. Accordingly, the luminances of red, green and blue in the first dot $DT_{i,j}$ may become uniform, thereby reducing the reddish phenomenon.

In an exemplary embodiment, the first through third pixels $PX_{i,j}$ through $PX_{i,j+2}$ of the first dot $DT_{i,j}$ have equal vertical lengths. However, a ratio of the horizontal length $W_j$ of the first pixel $PX_{i,j}$ of the first dot $DT_{i,j}$ and the horizontal length $W_{j+1}$ of the second pixel $PX_{i,j+1}$ of the first dot $DT_{i,j}$ may range from 1:3 to less than 1:1, for example. In addition, the horizontal length $W_{j+1}$ of the second pixel $PX_{i,j+1}$ of the first dot $DT_{i,j}$ may be equal to the horizontal length $W_{j+2}$ of the third pixel $PX_{i,j+2}$ of the first dot $DT_{i,j}$.

Figure 10:
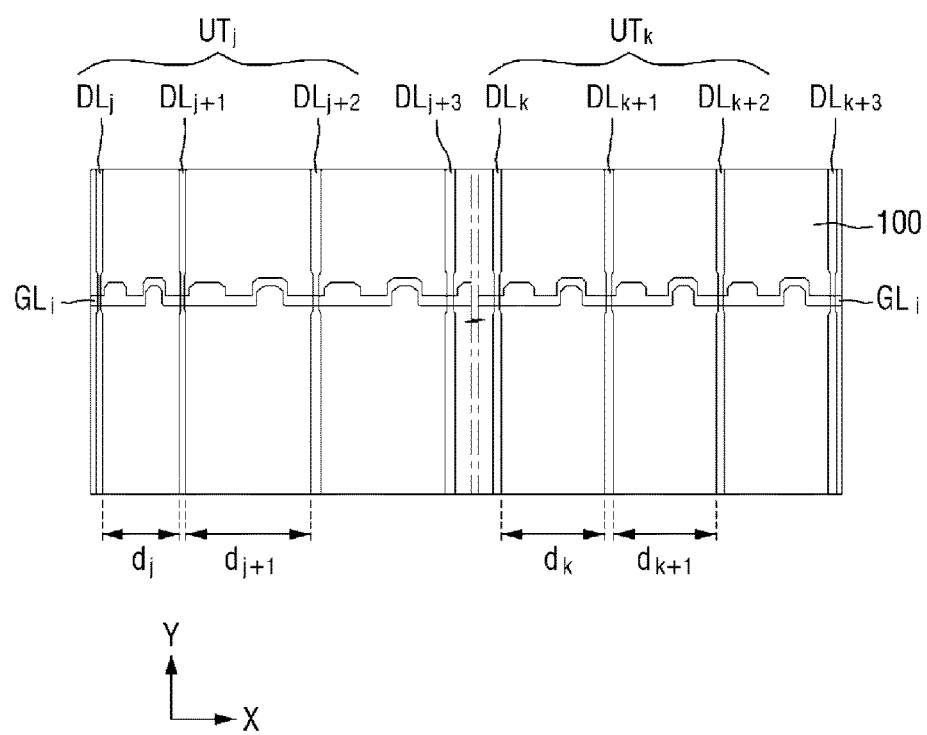
FIG. 10 is an enlarged plan view obtained by removing some elements from FIG. 9.

FIG. 10 is an enlarged plan view obtained by removing some elements from FIG. 9.

Specifically, FIG. 10 is an enlarged plan view obtained by removing all elements from FIG. 9, excluding a plurality of data lines ($DL_j$ through $DL_{k+3}$) and the gate line GL$_j$ disposed on the first substrate 100. Referring to FIGS. 9 and 10, the data lines ($DL_j$ through $DL_{k+3}$) extend parallel to each other along the second direction Y and are repeatedly arranged along the first direction X. Here, each data line may be electrically connected to a corresponding pixel, and the pixel may be located on the right side of the corresponding data line.

In the data lines ($DL_j$ through $DL_{k+3}$) according to the current embodiment, a first data line, a second data line and a third data line sequentially adjacent to each other may form a basic unit, and the basic unit may be repeated along the first direction X. A first basic unit $UT_j$ may sequentially include a first data line $DL_j$ which is electrically connected to the first pixel $PX_{i,j}$ displaying red in the first dot $DT_{i,j}$, a second data line $DL_{j+1}$ which is electrically connected to the second pixel $PX_{i,j+1}$ displaying green in the first dot $DT_{i,j}$, and a third data line $DL_{j+2}$ which is electrically connected to the third pixel $PX_{i,j+2}$ displaying blue in the first dot $DT_{i,j}$. In addition, a second basic unit $UT_k$ may sequentially include a first data line $DL_k$ which is electrically connected to the first pixel $PX_{i,k}$ of the second dot $DT_{i,k}$, a second data line $DL_{k+1}$ which is electrically connected to the second pixel $PX_{i,k+1}$ of the second dot $DT_{i,k}$, and a third data line $DL_{k+2}$ which is electrically connected to the third pixel $PX_{i,k+2}$ of the second dot $DT_{i,k}$.

If the first through third data lines $DL_j$ through $DL_{j+2}$ of the first basic unit $UT_j$ are compared with the first through third data lines $DL_k$ through $DL_{k+2}$ of the second basic unit $UT_k$, a distance $d_j$ between the first data line $DL_j$ of the first basic unit $UT_j$ and the second data line $DL_{j+1}$ of the first basic unit $UT_j$ is less than a distance $d_k$ between the first data line $DL_k$ of the second basic unit $UT_k$ and the second data line $DL_{k+1}$ of the second basic unit $UT_k$ in the current embodiment. In addition, a distance $d_{j+1}$ between the second data line $DL_{j+1}$ of the first basic unit $UT_j$ and the third data line $DL_{j+2}$ of the first basic unit $UT_j$ is greater than a distance $d_{k+1}$ between the second data line $DL_{k+1}$ of the second basic unit $UT_k$ and the third data line $DL_{k+2}$ of the second basic unit $UT_k$. Herein, 'a distance between data lines' may be a distance measured at a location where two data lines extending substantially parallel to each other are separated by a minimum distance.

In an exemplary embodiment, a horizontal length of the first basic unit $UT_j$ may be substantially equal to a horizontal length of the second basic unit $UT_k$. In addition, a ratio of the distance $d_j$ between the first data line $DL_j$ of the first basic unit $UT_j$ and the second data line $DL_{j+1}$ of the first basic unit $UT_j$ and the distance $d_k$ between the first data line $DL_k$ of the second basic unit $UT_k$ and the second data line $DL_{k+1}$ of the second basic unit $UT_k$ may range from 1:2 to less than 1:1, for example.

If distances $d_j$ and $d_{j+1}$ between the first through third data lines $DL_j$ through $DL_{j+2}$ of the first basic unit $UT_j$ are compared, the distance $d_j$ between the first data line $DL_j$ of the first basic unit $UT_j$ and the second data line $DL_{j+1}$ of the first basic unit $UT_j$ is less than the distance $d_{j+1}$ between the second data line $DL_{j+1}$ of the first basic unit $UT_j$ and the third data line $DL_{j+2}$ of the first basic unit $UT_j$.

The area of a pixel region located between data lines may be controlled by making data lines within one basic unit separated from each other by different distances. More specifically, the size of an opening region through which light transmits may be controlled by making data lines provided in a light-blocking region separated from each other by different distances on a plane.

In an exemplary embodiment, a ratio of the distance $d_j$ between the first data line $DL_j$ of the first basic unit $UT_j$ and the second data line $DL_{j+1}$ of the first basic unit $UT_j$ and the distance $d_{j+1}$ between the second data line $DL_{j+1}$ of the first basic unit $UT_j$ and the third data line $DL_{j+2}$ of the first basic unit $UT_j$ may range from 1:3 to less than 1:1, for example.

Further, the second region $R_2$ (right half plane) of the display area DA according to the current embodiment may be linearly symmetrical to the first region $R_1$ (left half plane) with respect to the central line C.

If the pixels $PX_{i,j}$ through $PX_{i,k+2}$ and the data lines $DL_j$ through $DL_{k+2}$ in the first region $R_1$ of the display area DA according to the current embodiment are configured as described above, the areas of first pixels displaying red may be gradually reduced from a central part of the display area DA toward both side edges of the display area DA in the first direction X. As a result, the reddish phenomenon that occurs depending on curvature may be reduced without a substantial reduction in aperture ratio.

Hereinafter, other embodiments of the invention will be described. The following description will focus mainly on differences with the previous embodiment in order to avoid redundancy.

Figure 11:
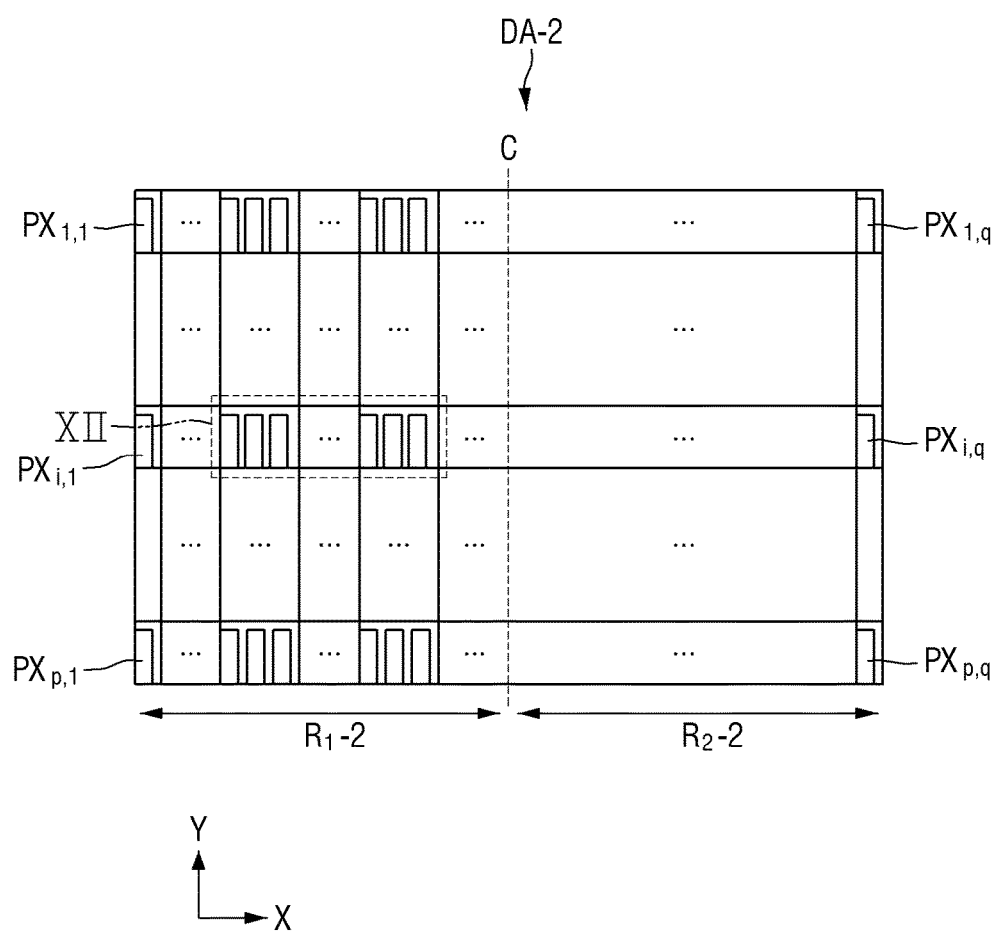
FIG. 11 is a schematic block diagram of another embodiment of a display area of an LCD according to the invention.
Figure 12:
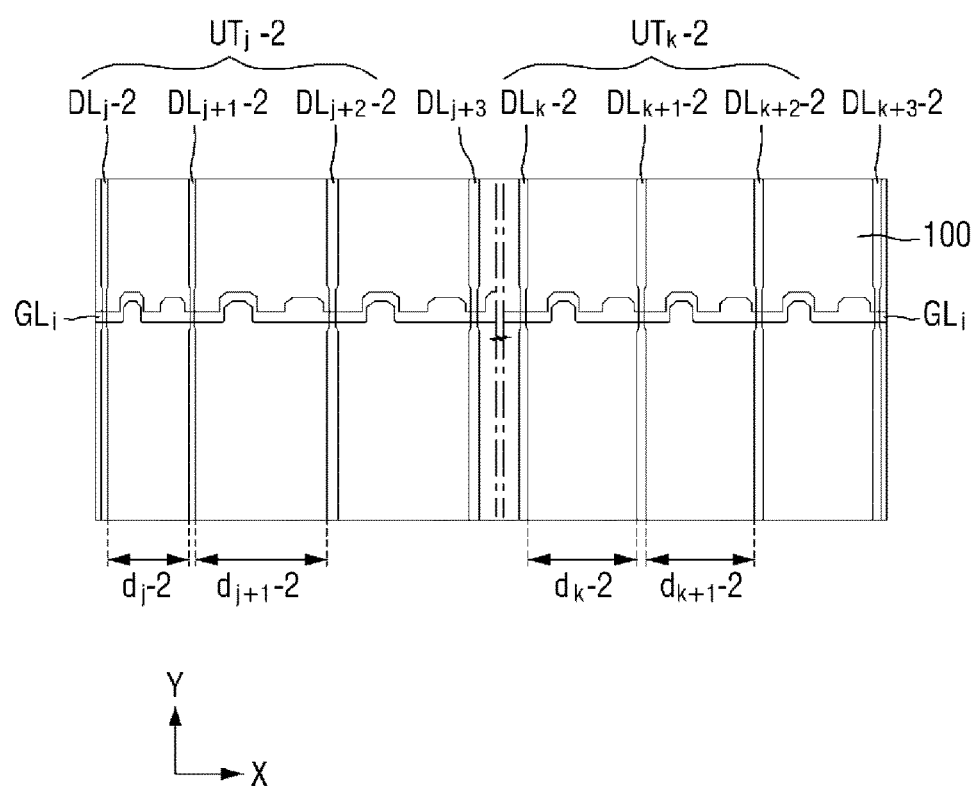
FIG. 12 is an enlarged plan view of a region 'XII' of FIG. 11, excluding some elements.

FIG. 11 is a schematic block diagram of a display area DA-2 of an LCD according to another embodiment of the invention. FIG. 12 is an enlarged plan view of a region 'XII' of FIG. 11, excluding some elements.

Referring to FIG. 11, the display area DA-2 according to the current embodiment may be divided into a first region $R_1$-2 and a second region $R_2$-2 by a virtual central line C that passes through a central point of the LCD and extends along the second direction Y. In an exemplary embodiment, the first region $R_1$-2 and the second region $R_2$-2 may be a left half plane and a right half plane of a landscape-type LCD, respectively.

Referring to FIG. 12, a plurality of data lines ($DL_j$-2 through $DL_{k+3}$-2) extend parallel to each other along the second direction Y and are repeatedly arranged along the first direction X. Here, each data line may be electrically connected to a corresponding pixel. The current embodiment is different from the previous embodiment in that the pixel is located to the left of the corresponding data line.

In the data lines ($DL_j$-2 through $DL_{k+3}$-2) according to the current embodiment, a first data line, a second data line and a third data line sequentially adjacent to each other may form a basic unit, and the basic unit may be repeated along the first direction X. A first basic unit $UT_j$-2 may sequentially include a first data line $DL_j$-2 which is electrically connected to a blue pixel, a second data line $DL_{j+1}$-2 which is electrically connected to a red pixel, and a third data line $DL_{j+2}$-2 which is electrically connected to a green pixel. In addition, a second basic unit $UT_k$-2 may sequentially include a first data line $DL_k$-2 which is electrically connected to a blue pixel, a second data line $DL_{k+1}$-2 which is electrically connected to a red pixel, and a third data line $DL_{k+2}$-2 which is electrically connected to a green pixel. Here, j is an integer greater than zero, and k is an integer greater than j.

The first data line $DL_j$-2 of the first basic unit $UT_j$-2 that forms a plurality of data lines in the first region $R_1$-2 (left half plane) of the display area DA-2 may be located further to the virtual central line C than the first data line $DL_k$-2 of the second basic unit $UT_k$-2.

A distance $d_j$-2 between the first data line $DL_j$-2 of the first basic unit $UT_j$-2 and the second data line $DL_{j+1}$-2 of the first basic unit $UT_j$-2 is less than a distance $d_k$-2 between the first data line $DL_k$-2 of the second basic unit $UT_k$-2 and the second data line $DL_{k+1}$-2 of the second basic unit $UT_k$-2. In addition, a distance $d_{j+1}$-2 between the second data line $DL_{j+1}$-2 of the first basic unit $UT_j$-2 and the third data line $DL_{j+2}$-2 of the first basic unit $UT_j$-2 is greater than a distance $d_{k+1}$-2 between the second data line $DL_{k+1}$-2 of the second basic unit $UT_k$-2 and the third data line $DL_{k+2}$-2 of the second basic unit $UT_k$-2.

In an exemplary embodiment, a horizontal length of the first basic unit $UT_j$-2 may be substantially equal to a horizontal length of the second basic unit $UT_k$-2. In an exemplary embodiment, a ratio of the distance $d_j$-2 between the first data line $DL_j$-2 of the first basic unit $UT_j$-2 and the second data line $DL_{j+1}$-2 of the first basic unit $UT_j$-2 and the distance $d_k$-2 between the first data line $DL_k$-2 of the second basic unit $UT_k$-2 and the second data line $DL_{k+1}$-2 of the second basic unit $UT_k$-2 may range from 1:2 to less than 1:1, for example.

The distance $d_j$-2 between the first data line $DL_j$-2 of the first basic unit $UT_j$-2 and the second data line $DL_{j+1}$-2 of the first basic unit $UT_j$-2 is less than the distance $d_{j+1}$-2 between the second data line $DL_{j+1}$-2 of the first basic unit $UT_j$-2 and the third data line $DL_{j+2}$-2 of the first basic unit $UT_j$-2.

In an exemplary embodiment, a ratio of the distance $d_j$-2 between the first data line $DL_j$-2 of the first basic unit $UT_j$-2 and the second data line $DL_{j+1}$-2 of the first basic unit $UT_j$-2 and the distance $d_{j+1}$-2 between the second data line $DL_{j+1}$-2 of the first basic unit $UT_j$-2 and the third data line $DL_{j+2}$-2 of the first basic unit $UT_j$-2 may range from 1:3 to less than 1:1, for example.

The reddish phenomenon may be reduced as in the previous embodiment by configuring a plurality of pixels and a plurality of data lines in the first region $R_1$-2 of the display area DA-2 as described above according to the current embodiment. In addition, each row of pixels may be connected in a zigzag pattern to a data line located to the left or right thereof, thereby making it easy to implement dot inversion, for example, z-inversion driving. Accordingly, it is possible to provide superior image quality and minimize power consumption and heat generation.

Figure 13:
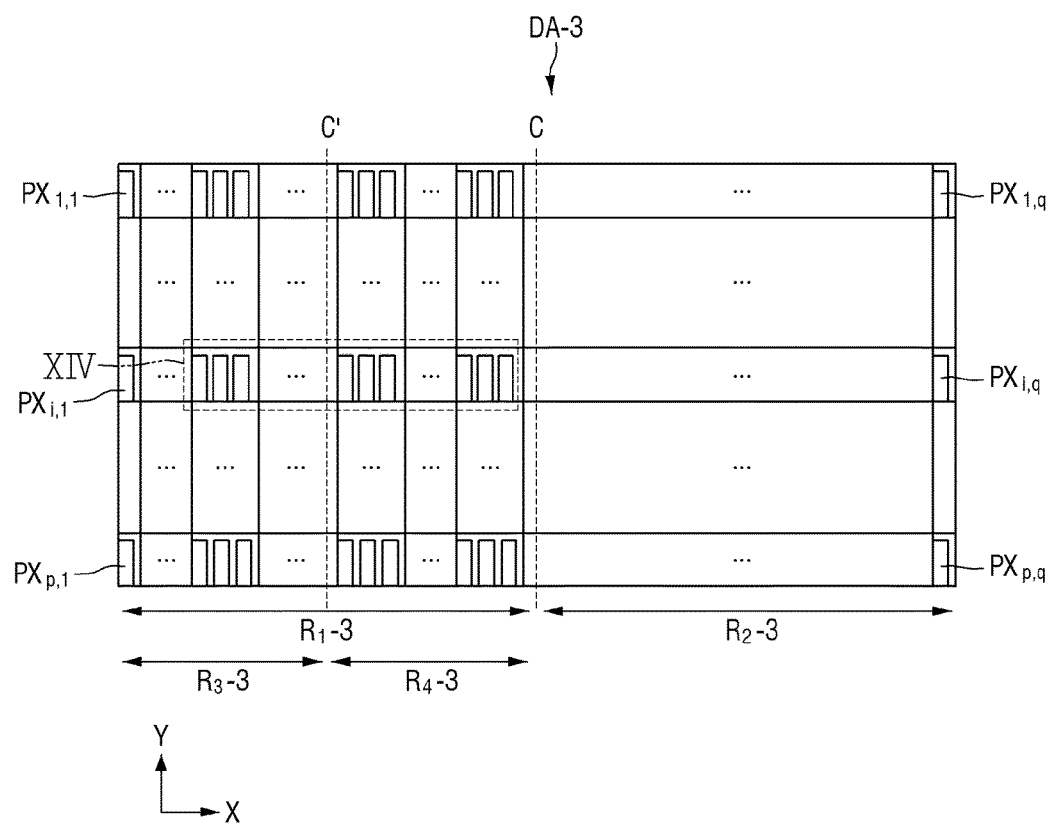
FIG. 13 is a schematic block diagram of another embodiment of a display area of an LCD according to the invention.
Figure 14:
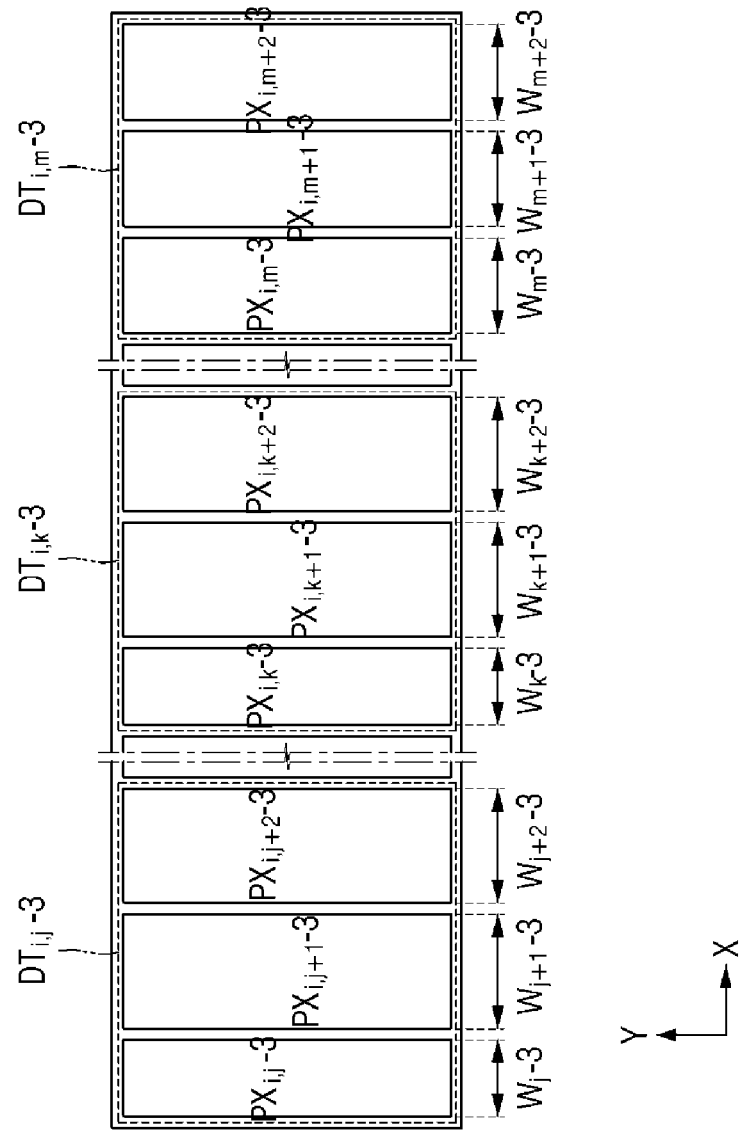
FIG. 14 is an enlarged plan view of a region 'XIV' of FIG. 13.
Figure 15:
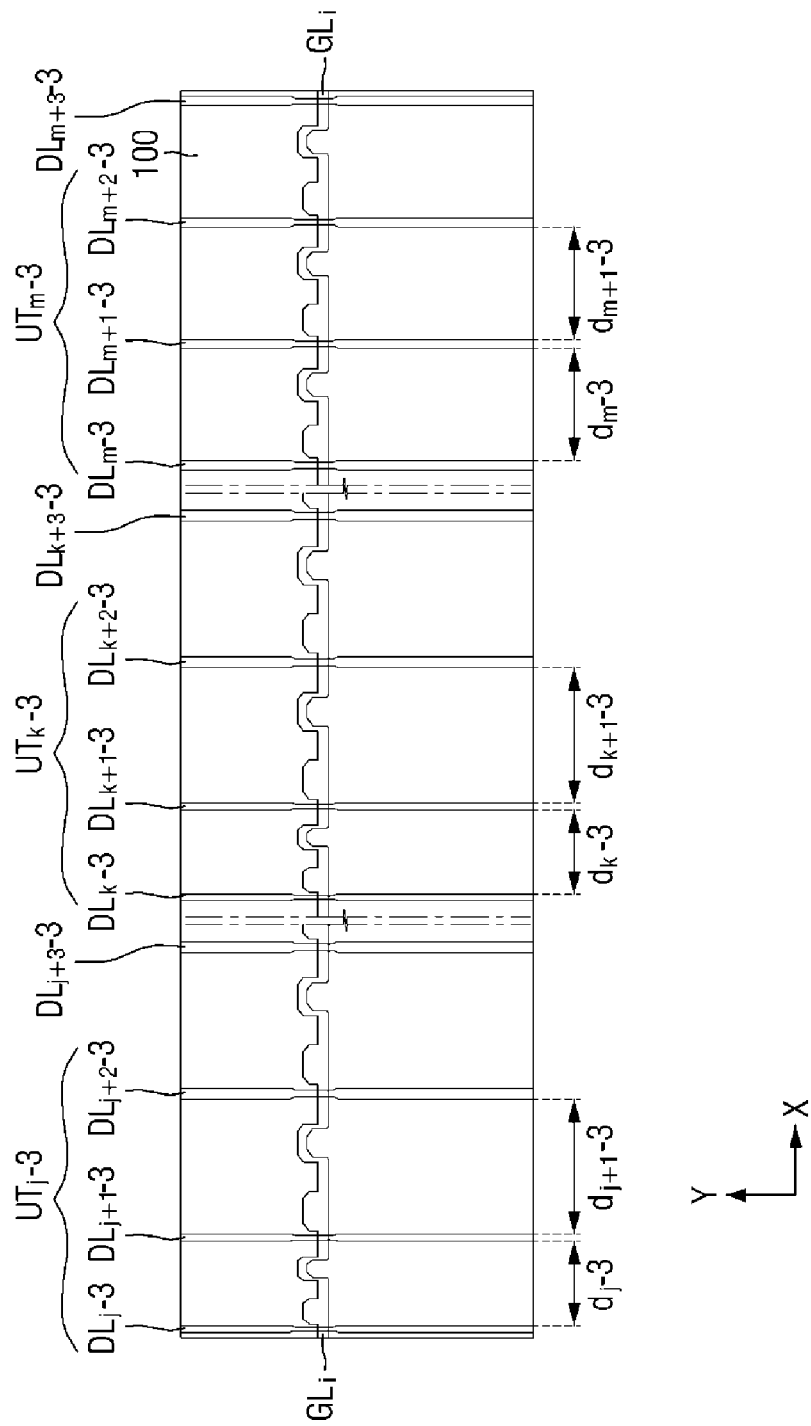
FIG. 15 is an enlarged plan view obtained by removing some elements from FIG. 14.

FIG. 13 is a schematic block diagram of a display area DA-3 of an LCD according to another embodiment of the invention. FIG. 14 is an enlarged plan view of a region 'XIV' of FIG. 13. FIG. 15 is an enlarged plan view obtained by removing some elements from FIG. 14.

Referring to FIG. 13, the display area DA-3 according to the current embodiment may be divided into a first region $R_1$-3 and a second region $R_2$-3 by a virtual central line C that passes through a central point of the LCD and extends along the second direction Y. In an exemplary embodiment, the first region $R_1$-3 and the second region $R_2$-3 may be a left half plane and a right half plane of a landscape-type LCD, respectively.

In addition, the first region $R_1$-3 may be divided into a $(1\_1)^{th}$ region $R_3$-3 and a $(1\_2)^{th}$ region $R_4$-3 by a virtual reference line C' that passes through an arbitrary point in the first region $R_1$-3 and extends along the second direction Y. The $(1\_1)^{th}$ region $R_3$-3 may be located further from the central line C than the $(1\_2)^{th}$ region $R_4$-3.

A ratio of the areas of the $(1\_1)^{th}$ region $R_3$-3 and the $(1\_2)^{th}$ region $R_4$-3 separated by the reference line C' may range from 1:4 to 1:1, for example. However, the invention is not limited thereto. In an exemplary embodiment, the reference line C' may bisect the first region $R_1$-3 such that the ratio of the area of the $(1\_1)^{th}$ region $R_3$-3 and the area of the $(1\_2)^{th}$ region $R_4$-3 is 1:2, for example.

A plurality of dots in the $(1\_1)^{th}$ region $R_3$-3 and the $(1\_2)^{th}$ region $R_4$-3 will now be compared and described in detail.

Referring to FIG. 14, pixels repeatedly arranged along the first direction X may form one row of a matrix of pixels. In this case, the pixels repeatedly arranged along the first direction X may include three pixels displaying three different colors as a basic unit, and the basic unit may be repeated along the first direction X. In an exemplary embodiment, a red pixel, a green pixel and a blue pixel may form a basic unit, and the basic unit may be repeated, for example. Three adjacent pixels ($PX_{i,j}$-3, $PX_{i,j+1}$-3 and $PX_{i,j+2}$-3) that form a basic unit define one dot ($DT_{i,j}$-3).

The pixels repeatedly arranged along the first direction X may include a first pixel $PX_{i,j}$-3 of a first dot $DT_{i,j}$-3, a second pixel $PX_{i,j+1}$-3 of the first dot $DT_{i,j}$-3, a third pixel $PX_{i,j+2}$-3 of the first dot $DT_{i,j}$-3, a first pixel $PX_{i,k}$-3 of a second dot $DT_{i,k}$-3, a second pixel $PX_{i,k+1}$-3 of the second dot $DT_{i,k}$-3, a third pixel $PX_{i,k+2}$-3 of the second dot $DT_{i,k}$-3, a first pixel $PX_{i,m}$-3 of a third dot $DT_{i,m}$-3, a second pixel $PX_{i,m+1}$-3 of the third dot $DT_{i,m}$-3, and a third pixel $PX_{i,m+2}$-3 of the third dot $DT_{i,m}$-3. The first pixels $PX_{i,j}$-3, $PX_{i,k}$-3 and $PX_{i,m}$-3 of the first, second and third dots $DT_{i,j}$-3, $DT_{i,k}$-3 and $DT_{i,m}$-3 display the same color, the second pixels $PX_{i,j+1}$-3, $PX_{i,k+1}$-3 and $PX_{i,m+1}$-3 of the first, second and third dots $DT_{i,j}$-3, $DT_{i,k}$-3 and $DT_{i,m}$-3 display the same color, and the third pixels $PX_{i,j+2}$-3, $PX_{i,k+2}$-3 and $PX_{i,m+2}$-3 of the first, second and third dots $DT_{i,j}$-3, $DT_{i,k}$-3 and $DT_{i,m}$-3 display the same color. In addition, i and j are integers greater than zero, k is an integer greater than j, and m is an integer greater than k.

The first dot $DT_{i,j}$-3 may be located in the $(1\_1)^{th}$ region $R_3$-3, and the second dot $DT_{i,k}$-3 and the third dot $DT_{i,m}$-3 may be located in the $(1\_2)^{th}$ region $R_4$-3. In addition, a distance between the first pixel $PX_{i,k}$-3 of the second dot $DT_{i,k}$-3 and the central line C in the first direction X is greater than a distance between the first pixel $PX_{i,m}$-3 of the third dot $DT_{i,m}$-3 and the central line C in the first direction X. That is, in the first region $R_1$-3 (left half plane) of the display area DA-3, the first pixel $PX_{i,k}$-3 of the second dot $DT_{i,k}$-3 may be located further to the central line C than the first pixel $PX_{i,m}$-3 of the third dot $DT_{i,m}$-3, and the first pixel $PX_{i,j}$-3 of the first dot $DT_{i,j}$-3 may be located further to the reference line C' than the first pixel $PX_{i,k}$-3 of the second dot $DT_{i,k}$-3.

The areas and shapes of the first through third pixels $PX_{i,j}$-3 through $PX_{i,j+2}$-3 of the first dot $DT_{i,j}$-3 may be substantially the same as those of the first through third pixels $PX_{i,k}$-3 through $PX_{i,k+2}$-3 of the second dot $DT_{i,k}$-3, respectively. In addition, the areas and shapes of all pixels included in the $(1\_1)^{th}$ region $R_3$-3 may be substantially the same as those of the first through third pixels $PX_{i,j}$-3 through $PX_{i,j+2}$-3 of the first dot $DT_{i,j}$-3, respectively.

The area of the first pixel $PX_{i,k}$-3 of the second dot $DT_{i,k}$-3 is less than that of the first pixel $PX_{i,m}$-3 of the third dot $DT_{i,m}$-3. Since the area of the second dot $DT_{i,k}$-3 is substantially equal to that of the third dot $DT_{i,m}$-3, the sum of the area of the second pixel $PX_{i,k+1}$-3 of the second dot $DT_{i,k}$-3 and the area of the third pixel $PX_{i,k+2}$-3 of the second dot $DT_{i,k}$-3 is greater than the sum of the area of the second pixel $PX_{i,m+1}$-3 of the third dot $DT_{i,m}$-3 and the area of the third pixel $PX_{i,m+2}$-3 of the third dot $DT_{i,m}$-3.

In an exemplary embodiment, the first through third pixels $PX_{i,j}$-3 through $PX_{i,j+2}$-3 of the first dot $DT_{i,j}$-3, the first through third pixels $PX_{i,k}$-3 through $PX_{i,k+2}$-3 of the second dot $DT_{i,k}$-3, and the first through third pixels $PX_{i,m}$-3 through $PX_{i,m+2}$-3 of the third dot $DT_{i,m}$-3 may have equal vertical lengths. However, a horizontal length $W_j$-3 of the first pixel $PX_{i,j}$-3 of the first dot $DT_{i,j}$-3 may be equal to a horizontal length $W_k$-3 of the first pixel $PX_{i,k}$-3 of the second dot $DT_{i,k}$-3, and the horizontal length $W_k$-3 of the first pixel $PX_{i,k}$-3 of the second dot $DT_{i,k}$-3 may be less than a horizontal length $W_m$-3 of the first pixel $PX_{i,m}$-3 of the third dot $DT_{i,m}$-3. In addition, the sum of horizontal lengths $W_{k+1}$-3 and $W_{k+2}$-3 of the second and third pixels $PX_{i,k+1}$-3 and $PX_{i,k+2}$-3 of the second dot $DT_{i,k}$-3 may be greater than the sum of horizontal lengths $W_{m+1}$-3 and $W_{m+2}$-3 of the second and third pixels $PX_{i,m+1}$-3 and $PX_{i,m+2}$-3 of the third dot $DT_{i,m}$-3.

The area of the first pixel $PX_{i,k}$-3 of the second dot $DT_{i,k}$-3 is less than those of the second and third pixels $PX_{i,k+1}$-3 and $PX_{i,k+2}$-3 of the second dot $DT_{i,k}$-3. In addition, the area of the second pixel $PX_{i,k+1}$-3 of the second dot $DT_{i,k}$-3 is substantially equal to that of the third pixel $PX_{i,k+2}$-3 of the second dot $D_{i,k}$-3.

In an exemplary embodiment, the first through third pixels $PX_{i,k}$-3 through $PX_{i,k+2}$-3 of the second dot $DT_{i,k}$-3 may have equal vertical lengths. However, a ratio of the horizontal length $W_k$-3 of the first pixel $PX_{i,k}$-3 of the second dot $DT_{i,k}$-3 and the horizontal length $W_{k+1}$-3 of the second pixel $PX_{i,k+1}$-3 of the second dot $DT_{i,k}$-3 may range from 1:3 to less than 1:1, for example. In addition, the horizontal length $W_{k+1}$-3 of the second pixel $PX_{i,k+1}$-3 of the second dot $DT_{i,k}$-3 may be equal to the horizontal length $W_{k+2}$-3 of the third pixel $PX_{i,k+2}$-3 of the second dot $DT_{i,k}$-3.

Referring to FIG. 15, a plurality of data lines ($DL_j$-3 through $DL_{m+3}$-3) extend parallel to each other along the second direction Y and are repeatedly arranged along the first direction X. Here, each data line may be electrically connected to a corresponding pixel. The pixel may be located on the right side of the corresponding data line.

In the data lines ($DL_j$-3 through $DL_{m+3}$-3) according to the current embodiment, a first data line, a second data line and a third data line sequentially adjacent to each other may form a basic unit, and the basic unit may be repeated along the first direction X. A first basic unit $UT_j$-3 may sequentially include a first data line $DL_j$-3 which is electrically connected to the first pixel $PX_{i,j}$-3 displaying red in the first dot $DT_{i,j}$-3, a second data line $DL_{j+1}$-3 which is electrically connected to the second pixel $PX_{i,j+1}$-3 displaying green in the first dot $DT_{i,j}$-3, and a third data line $DL_{j+2}$-3 which is electrically connected to the third pixel $PX_{j+2}$-3 displaying blue in the first dot $DT_{i,j}$-3. In addition, a second basic unit $UT_k$-3 may sequentially include a first data line $DL_k$-3 which is electrically connected to the first pixel $PX_{i,k}$-3 of the second dot $DT_{i,k}$-3, a second data line $DL_{k+1}$-3 which is electrically connected to the second pixel $PX_{i,k+1}$-3 of the second dot $DT_{i,k}$-3, and a third data line $DL_{k+2}$-3 which is electrically connected to the third pixel $PX_{i,k+2}$-3 of the second dot $DT_{i,k}$-3. Further, a third basic unit $UT_m$-3 may sequentially include a first data line $DL_m$-3 which is electrically connected to the first pixel $PX_{i,m}$-3 of the third dot $DT_{i,m}$-3, a second data line $DL_{m+1}$-3 which is electrically connected to the second pixel $PX_{i,m+1}$-3 of the third dot $DT_{i,m}$-3, and a third data line $DL_{m+2}$-3 which is electrically connected to the third pixel $PX_{i,m+2}$-3 of the third dot $DT_{i,m}$-3.

Distances between and shapes of the first through third data lines $DL_j$-3 through $DL_{j+2}$-3 of the first basic unit $UT_j$-3 may be substantially the same as distances between and shapes of the first through third data lines $DL_k$-3 through $DL_{k+2}$-3 of the second basic unit $UT_k$-3.

A distance $d_k$-3 between the first data line $DL_k$-3 of the second basic unit $UT_k$-3 and the second data line $DL_{k+1}$-3 of the second basic unit $UT_k$-3 is less than a distance $d_m$-3 between the first data line $DL_m$-3 of the third basic unit $UT_m$-3 and the second data line $DL_{m+1}$-3 of the third basic unit $UT_m$-3. In addition, a distance $d_{k+1}$-3 between the second data line $DL_{k+1}$-3 of the second basic unit $UT_k$-3 and the third data line $DL_{k+2}$-3 of the second basic unit $UT_k$-3 is greater than a distance $d_{m+1}$-3 between the second data line $DL_{m+1}$-3 of the third basic unit $UT_m$-3 and the third data line $DL_{m+2}$-3 of the third basic unit $UT_m$-3.

In an exemplary embodiment, a horizontal length of the second basic unit $UT_k$-3 may be substantially equal to a horizontal length of the third basic unit $UT_m$-3. In an exemplary embodiment, a ratio of the distance $d_k$-3 between the first data line $DL_k$-3 of the second basic unit $UT_k$-3 and the second data line $DL_{k+1}$-3 of the second basic unit $UT_k$-3 and the distance $d_m$-3 between the first data line $DL_m$-3 of the third basic unit $UT_m$-3 and the second data line $DL_{m+1}$-3 of the third basic unit $UT_m$-3 may range from 1:2 to less than 1:1, for example.

The distance $d_k$-3 between the first data line $DL_k$-3 of the second basic unit $UT_k$-3 and the second data line $DL_{k+1}$-3 of the second basic unit $UT_k$-3 is less than the distance $d_{k+1}$-3 between the second data line $DL_{k+1}$-3 of the second basic unit $UT_k$-3 and the third data line $DL_{k+2}$-3 of the second basic unit $UT_k$-3.

In an exemplary embodiment, a ratio of the distance $d_k$-3 between the first data line $DL_k$-3 of the second basic unit $UT_k$-2 and the second data line $DL_{k+1}$-3 of the second basic unit $UT_k$-3 and the distance $d_{k+1}$-3 between the second data line $DL_{k+1}$-3 of the second basic unit $UT_k$-3 and the third data line $DL_{k+2}$-3 of the second basic unit $UT_k$-3 may range from 1:3 to less than 1:1, for example.

If a plurality of pixels and a plurality of data lines in the first region $R_1$-3 of the display area DA-3 according to the current embodiment are configured as described above, the areas of first pixels displaying red may be gradually reduced from a central part of the display area DA-3 toward both side edges of the display area DA-3 in the first direction X. In addition, the areas of the first pixels may be maintained constant from a location corresponding to one sixth of a side of the display area DA-3 in the first direction X from the central part of the display area DA-3 and from a location corresponding to one sixth of the other side of the display area DA-3 in the first direction X from the central part of the display area DA-3. As a result, the reddish phenomenon that occurs depending on curvature may be reduced without a substantial reduction in aperture ratio. Moreover, the LCD may be manufactured in a desired shape without limitations on curvature.

Figure 16:
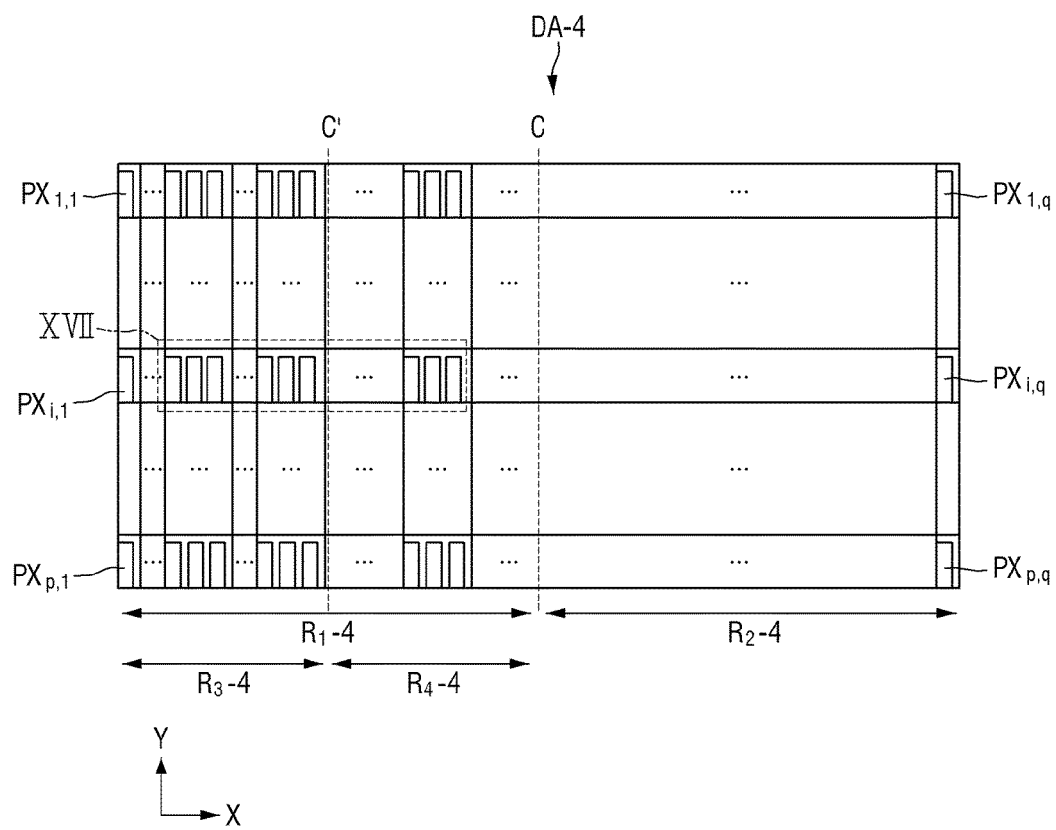
FIG. 16 is a schematic block diagram of another embodiment of a display area of an LCD according to the invention.
Figure 17:
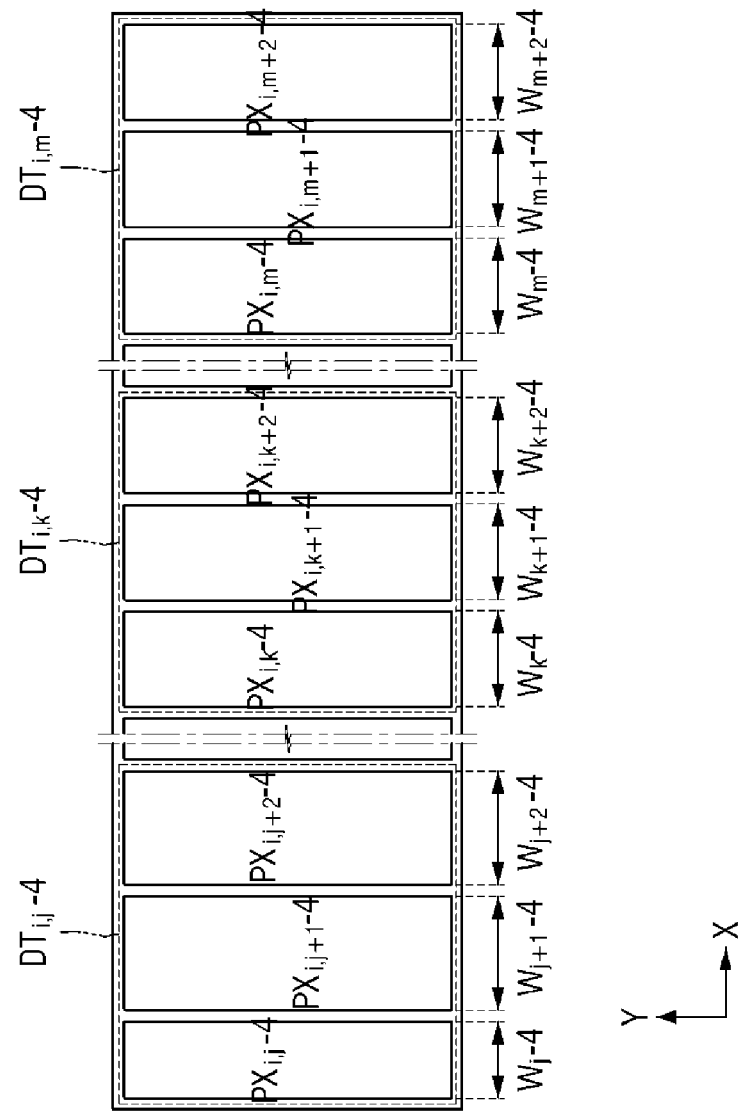
FIG. 17 is an enlarged plan view of a region 'XVII' of FIG. 16.
Figure 18:
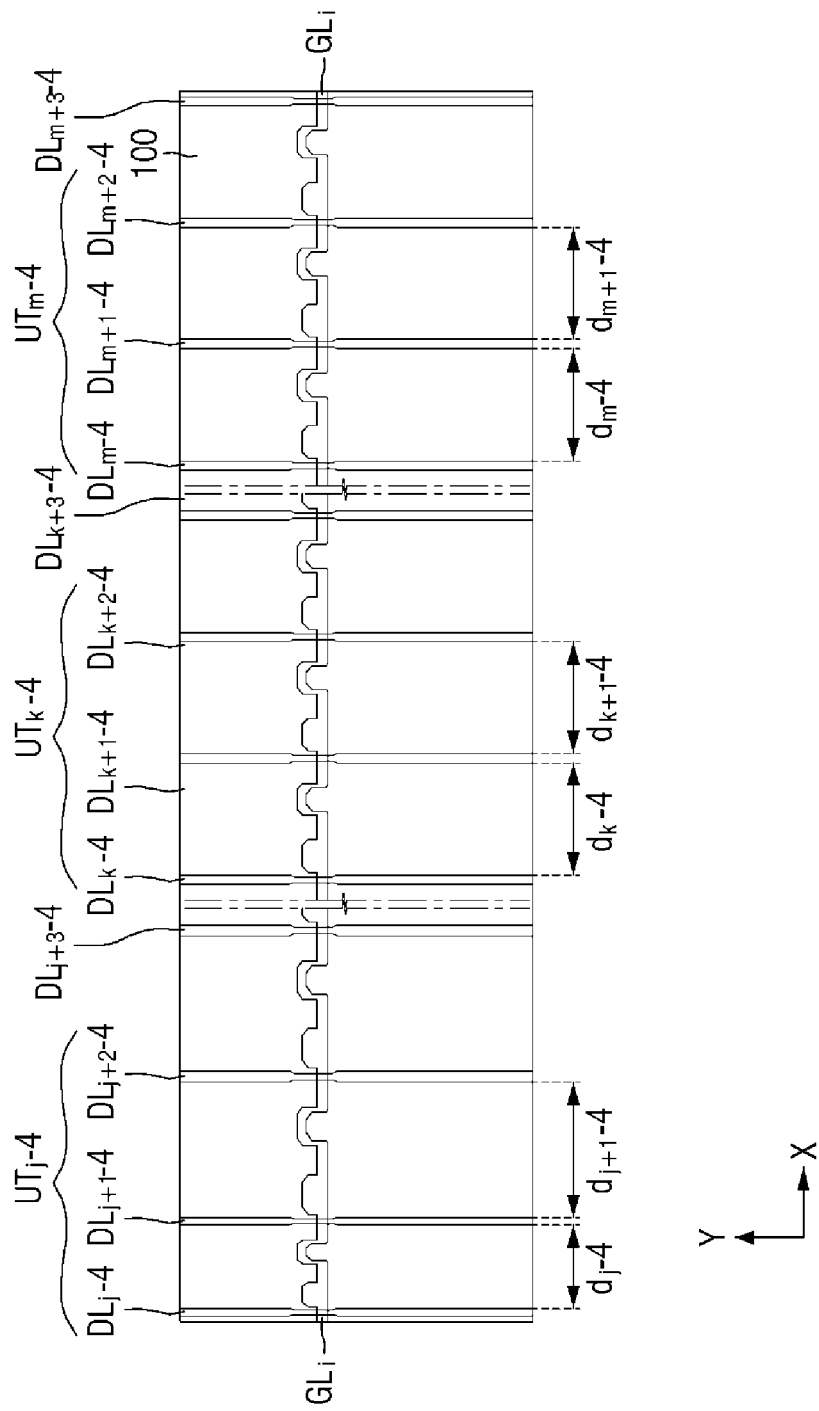
FIG. 18 is an enlarged plan view obtained by removing some elements from FIG. 17.

FIG. 16 is a schematic block diagram of a display area DA-4 of an LCD according to another embodiment of the invention. FIG. 17 is an enlarged plan view of a region 'XVII' of FIG. 16. FIG. 18 is an enlarged plan view obtained by removing some elements from FIG. 17.

Referring to FIG. 16, the display area DA-4 according to the current embodiment may be divided into a first region $R_1$-4 and a second region $R_2$-4 by a virtual central line C that passes through a central point of the LCD and extends along the second direction Y. In an exemplary embodiment, the first region $R_1$-4 and the second region $R_2$-4 may be a left half plane and a right half plane of a landscape-type LCD, respectively.

In addition, the first region $R_1$-4 may be divided into a $(1\_1)^{th}$ region $R_3$-4 and a $(1\_2)^{th}$ region $R_4$-4 by a virtual reference line C' that passes through an arbitrary point in the first region $R_1$-4 and extends along the second direction Y. The $(1\_1)^{th}$ region $R_3$-4 may be located further away from the central line C than the $(1\_2)^{th}$ region $R_4$-4.

In an exemplary embodiment, a ratio of the areas of the $(1\_1)^{th}$ region $R_3$-4 and the $(1\_2)^{th}$ region $R_4$-4 separated by the reference line C' may range from 1:4 to 1:1, for example. However, the invention is not limited thereto. In an exemplary embodiment, the reference line C' may bisect the first region $R_1$-4 such that the ratio of the area of the $(1\_1)^{th}$ region $R_3$-4 and the area of the $(1\_2)^{th}$ region $R_4$-4 is 1:2, for example. A plurality of dots in the $(1\_1)^{th}$ region $R_3$-4 and the $(1\_2)^{th}$ region $R_4$-4 will now be compared and described in detail.

Referring to FIG. 17, pixels repeatedly arranged along the first direction X may form one row of a matrix of pixels. In this case, the pixels repeatedly arranged along the first direction X may include three pixels displaying three different colors as a basic unit, and the basic unit may be repeated along the first direction X. In an exemplary embodiment, a red pixel, a green pixel and a blue pixel may form a basic unit, and the basic unit may be repeated. Three adjacent pixels $PX_{i,j}$-4, $PX_{i,j+1}$-4 and $PX_{i,j+2}$-4 that form a basic unit define one dot $DT_{i,j}$-4.

The pixels repeatedly arranged along the first direction X may include a first pixel $PX_{i,j}$-4 of a first dot $DT_{i,j}$-4, a second pixel $PX_{i,j+1}$-4 of the first dot $DT_{i,j}$-4, a third pixel $PX_{i,j+2}$-4 of the first dot $DT_{i,j}$-4, a first pixel $PX_{i,k}$-4 of a second dot $DT_{i,k}$-4, a second pixel $PX_{i,k+1}$-4 of the second dot $DT_{i,k}$-4, a third pixel $PX_{i,k+2}$-4 of the second dot $DT_{i,k}$-4, a first pixel $PX_{i,m}$-4 of a third dot $DT_{i,m}$-4, a second pixel $PX_{i,m+1}$-4 of the third dot $DT_{i,m}$-4, and a third pixel $PX_{i,m+2}$-4 of the third dot $DT_{i,m}$-4. The first pixels $PX_{i,j}$-4, $PX_{i,k}$-4 and $PX_{i,m}$-4 of the first, second and third dots $DT_{i,j}$-4, $DT_{i,k}$-4 and $DT_{i,m}$-4 display the same color, the second pixels $PX_{i,j+1}$-4, $PX_{i,k+1}$-4 and $PX_{i,m+1}$-4 of the first, second and third dots $DT_{i,j}$-4, $DT_{i,k}$-4 and $DT_{i,m}$-4 display the same color, and the third pixels $PX_{i,j+2}$-4, $PX_{i,k+2}$-4 and $PX_{i,m+2}$-4 of the first, second and third dots $DT_{i,j}$-4, $DT_{i,k}$-4 and $DT_{i,m}$-4 display the same color. In addition, i and j are integers greater than zero, k is an integer greater than j, and m is an integer greater than k.

The first dot $DT_{i,j}$-4 and the second dot $DT_{i,k}$-4 may be located in the $(1\_1)^{th}$ region $R_3$-4, and the third dot $DT_{i,m}$-4 may be located in the $(1\_2)^{th}$ region $R_4$-4. In addition, a distance between the first pixel $PX_{i,j}$-4 of the first dot DM-4 and the central line C in the first direction X is greater than a distance between the first pixel $PX_{i,k}$-4 of the second dot $DT_{i,k}$-4 and the central line C in the first direction X. That is, in the first region $R_1$-4 (left half plane) of the display area DA-4, the first pixel $PX_{i,j}$-4 of the first dot $DT_{i,j}$-4 may be located further to the central line C than the first pixel $PX_{i,k}$-4 of the second dot $DT_{i,k}$-4, and the first pixel $PX_{i,k}$-4 of the second dot $DT_{i,k}$-4 may be located further to the central line C than the first pixel $PX_{i,m}$-4 of the third dot $DT_{i,m}$-4.

The area of the first pixel $PX_{i,j}$-4 of the first dot $DT_{i,j}$-4 is less than that of the first pixel $PX_{i,k}$-4 of the second dot $DT_{i,k}$-4. Since the area of the first dot $DT_{i,j}$-4 is substantially equal to that of the second dot $DT_{i,k}$-4, the sum of the area of the second pixel $PX_{i,j+1}$-4 of the first dot DM-4 and the area of the third pixel $PX_{i,j+2}$-4 of the first dot $DT_{i,j}$-4 is greater than the sum of the area of the second pixel $PX_{i,k+1}$-4 of the second dot $DT_{i,k}$-4 and the area of the third pixel $PX_{i,k+2}$-4 of the second dot $DT_{i,k}$-4.

In an exemplary embodiment, the first through third pixels $PX_{i,j}$-4 through $PX_{i,j+2}$-4 of the first dot $DT_{i,j}$-4, the first through third pixels $PX_{i,k}$-4 through $PX_{i,k+2}$-4 of the second dot $DT_{i,k}$-4, and the first through third pixels $PX_{i,m}$-4 through $PX_{i,m+2}$-4 of the third dot $DT_{i,m}$-4 may have equal vertical lengths. However, a horizontal length $W_j$-4 of the first pixel $PX_{i,j}$-4 of the first dot $DT_{i,j}$-4 may be less than a horizontal length $W_k$-4 of the first pixel $PX_{i,k}$-4 of the second dot $DT_{i,k}$-4, and the horizontal length $W_k$-4 of the first pixel $PX_{i,k}$-4 of the second dot $DT_{i,k}$-4 may be equal to a horizontal length $W_m$-4 of the first pixel $PX_{i,m}$-4 of the third dot $DT_{i,m}$-4. In addition, the sum of horizontal lengths $W_{j+1}$-4 and $W_{j+2}$-4 of the second and third pixels $PX_{i,j+1}$-4 and $PX_{i,j+2}$-4 of the first dot $DT_{i,j}$-4 may be greater than the sum of horizontal lengths $W_{k+1}$-4 and $W_{k+2}$-4 of the second and third pixels $PX_{i,k+1}$-4 and $PX_{i,k+2}$-4 of the second dot $DT_{i,k}$-4.

The area of the first pixel $PX_{i,j}$-4 of the first dot $DT_{i,j}$-4 is less than those of the second and third pixels $PX_{i,j+1}$-4 and $PX_{i,j+2}$-4 of the first dot $DT_{i,j}$-4. In addition, the area of the second pixel $PX_{i,j+1}$-4 of the first dot $DT_{i,j}$-4 is substantially equal to that of the third pixel $PX_{i,j+2}$-4 of the first dot $DT_{i,j}$-4.

In an exemplary embodiment, the first through third pixels $PX_{i,j}$-4 through $PX_{i,j+2}$-4 of the first dot $DT_{i,j}$-4 may have equal vertical lengths. However, a ratio of the horizontal length $W_j$-4 of the first pixel $PX_{i,j}$-4 of the first dot $DT_{i,j}$-4 and the horizontal length $W_{j+1}$-4 of the second pixel $PX_{i,j+1}$-4 of the first dot $DT_{i,j}$-4 may range from 1:3 to less than 1:1, for example. In addition, the horizontal length $W_{j+1}$-4 of the second pixel $PX_{i,j+1}$-4 of the first dot $DT_{i,j}$-4 may be equal to the horizontal length $W_{j+2}$-4 of the third pixel $PX_{i,j+2}$-4 of the first dot $DT_{i,j}$-4.

The areas and shapes of the first through third pixels $PX_{i,m}$-4 through $PX_{i,m+2}$-4 of the third dot $DT_{i,m}$-4 may be substantially the same as those of the first through third pixels $PX_{i,k}$-4 through $PX_{i,k+2}$-4 of the second dot $DT_{i,k}$-4, respectively. In addition, the areas and shapes of all pixels included in the $(1\_2)^{th}$ region $R_4$-4 may be substantially the same as those of the first through third pixels $PX_{i,m}$-4 through $PX_{i,m+2}$-4 of the third dot $DT_{i,m}$-4, respectively.

Referring to FIG. 18, a plurality of data lines ($DL_j$-4 through $DL_{m+3}$-4) extend parallel to each other along the second direction Y and are repeatedly arranged along the first direction X. Here, each data line may be electrically connected to a corresponding pixel. The pixel may be located on the right side of the corresponding data line.

In the data lines ($DL_j$-4 through $DL_{m+3}$-4) according to the current embodiment, a first data line, a second data line and a third data line sequentially adjacent to each other may form a basic unit, and the basic unit may be repeated along the first direction X. A first basic unit $UT_j$-4 may sequentially include a first data line $DL_j$-4 which is electrically connected to the first pixel $PX_{i,j}$-4 displaying red in the first dot $DT_{i,j}$-4, a second data line $DL_{j+1}$-4 which is electrically connected to the second pixel $PX_{i,j+1}$-4 displaying green in the first dot $DT_{i,j}$-4, and a third data line $DL_{j+2}$-4 which is electrically connected to the third pixel $PX_{i,j+2}$-4 displaying blue in the first dot $DT_{i,j}$-4. In addition, a second basic unit $UT_k$-4 may sequentially include a first data line $DL_k$-4 which is electrically connected to the first pixel $PX_{i,k}$-4 of the second dot $DT_{i,k}$-4, a second data line $DL_{k+1}$-4 which is electrically connected to the second pixel $PX_{i,k+1}$-4 of the second dot $DT_{i,k}$-4, and a third data line $DL_{k+2}$-4 which is electrically connected to the third pixel $PX_{i,k+2}$-4 of the second dot $DT_{i,k}$-4. Further, a third basic unit $UT_m$-4 may sequentially include a first data line $DL_m$-4 which is electrically connected to the first pixel $PX_{i,m}$-4 of the third dot $DT_{i,m}$-4, a second data line $DL_{m+1}$-4 which is electrically connected to the second pixel $PX_{i,m+1}$-4 of the third dot $DT_{i,m}$-4, and a third data line $DL_{m+2}$-4 which is electrically connected to the third pixel $PX_{i,m+2}$-4 of the third dot $DT_{i,m}$-4.

A distance $d_j$-4 between the first data line $DL_j$-4 of the first basic unit $UT_j$-4 and the second data line $DL_{j+1}$-4 of the first basic unit $UT_j$-4 is less than a distance $d_k$-4 between the first data line $DL_k$-4 of the second basic unit $UT_k$-4 and the second data line $DL_{k+1}$-4 of the second basic unit $UT_k$-4. In addition, a distance $d_{j+1}$-4 between the second data line $DL_{j+1}$-4 of the first basic unit $UT_j$-4 and the third data line $DL_{j+2}$-4 of the first basic unit $UT_j$-4 is greater than a distance $d_{k+1}$-4 between the second data line $DL_{k+1}$-4 of the second basic unit $UT_k$-4 and the third data line $DL_{k+2}$-4 of the second basic unit $UT_k$-4.

In an exemplary embodiment, a horizontal length of the first basic unit $UT_j$-4 may be substantially equal to a horizontal length of the second basic unit $UT_k$-4. In addition, a ratio of the distance $d_j$-4 between the first data line $DL_j$-4 of the first basic unit $UT_j$-4 and the second data line $DL_{j+1}$-4 of the first basic unit $UT_j$-4 and the distance $d_k$-4 between the first data line $DL_k$-4 of the second basic unit $UT_k$-4 and the second data line $DL_{k+1}$-4 of the second basic unit $UT_k$-4 may range from 1:2 to less than 1:1, for example.

The distance $d_j$-4 between the first data line $DL_j$-4 of the first basic unit $UT_j$-4 and the second data line $DL_{j+1}$-4 of the first basic unit $UT_j$-4 is less than the distance $d_{j+1}$-4 between the second data line $DL_{j+1}$-4 of the first basic unit $UT_j$-4 and the third data line $DL_{j+2}$-4 of the first basic unit $UT_j$-4.

In an exemplary embodiment, a ratio of the distance $d_j$-4 between the first data line $DL_j$-4 of the first basic unit $UT_j$-4 and the second data line $DL_{j+1}$-4 of the first basic unit $UT_j$-4 and the distance $d_{j+1}$-4 between the second data line $DL_{j+1}$-4 of the first basic unit $UT_j$-4 and the third data line $DL_{j+2}$-4 of the first basic unit $UT_j$-4 may range from 1:3 to less than 1:1, for example.

Distances between and shapes of the first through third data lines $DL_m$-4 through $DL_{m+2}$-4 of the third basic unit $UT_m$-4 may be substantially the same as distances between and shapes of the first through third data lines $DL_k$-4 through $DL_{k+2}$-4 of the second basic unit $UT_k$-4.

If a plurality of pixels and a plurality of data lines in the first region $R_1$-4 of the display area DA-4 according to the current embodiment are configured as described above, the areas of first pixels displaying red may be maintained constant from a central part of the display area DA-4 toward both side edges of the display area DA-4 in the first direction X. In addition, the areas of the first pixels may be gradually reduced from a location corresponding to one sixth of a side of the display area DA-4 in the first direction X from the central part of the display area DA-4 and from a location corresponding to one sixth of the other side of the display area DA-4 in the first direction X from the central part of the display area DA-4. As a result, the reddish phenomenon that is more apparent in an edge part of the LCD having a greater curvature than the central part of the LCD may be reduced without a substantial reduction in aperture ratio.

Figure 19:
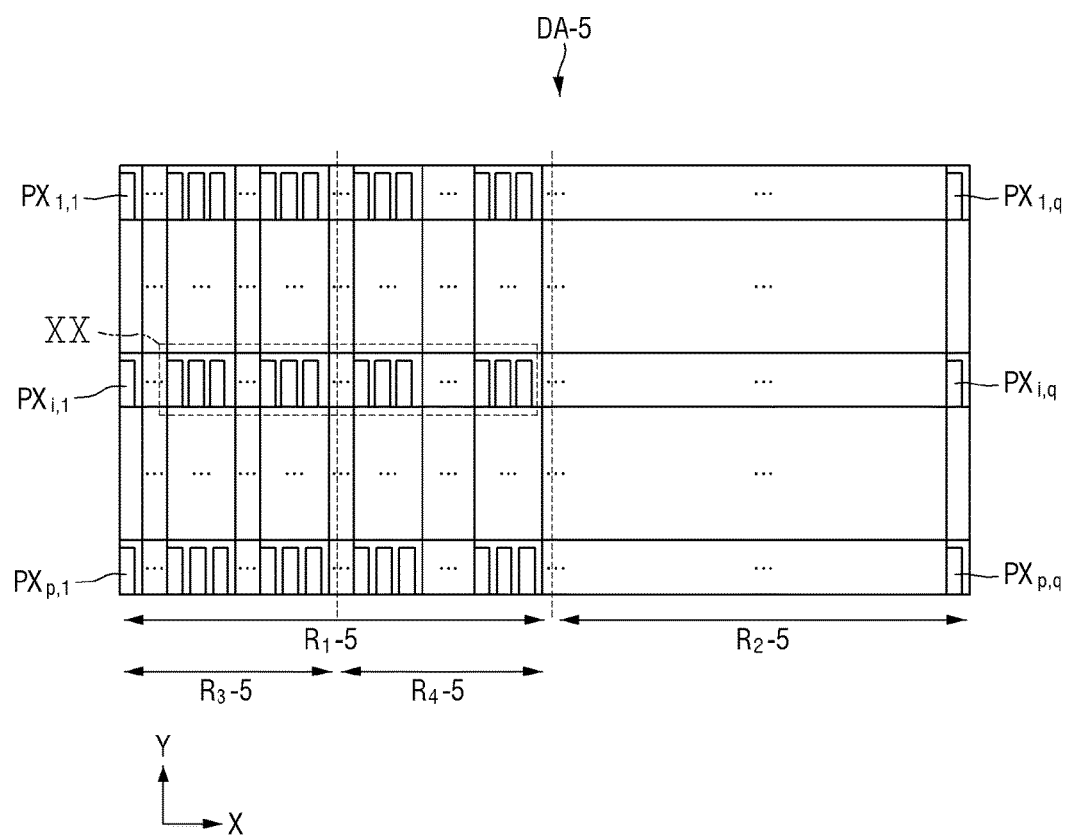
FIG. 19 is a schematic block diagram of another embodiment of a display area of an LCD according to the invention.
Figure 20:
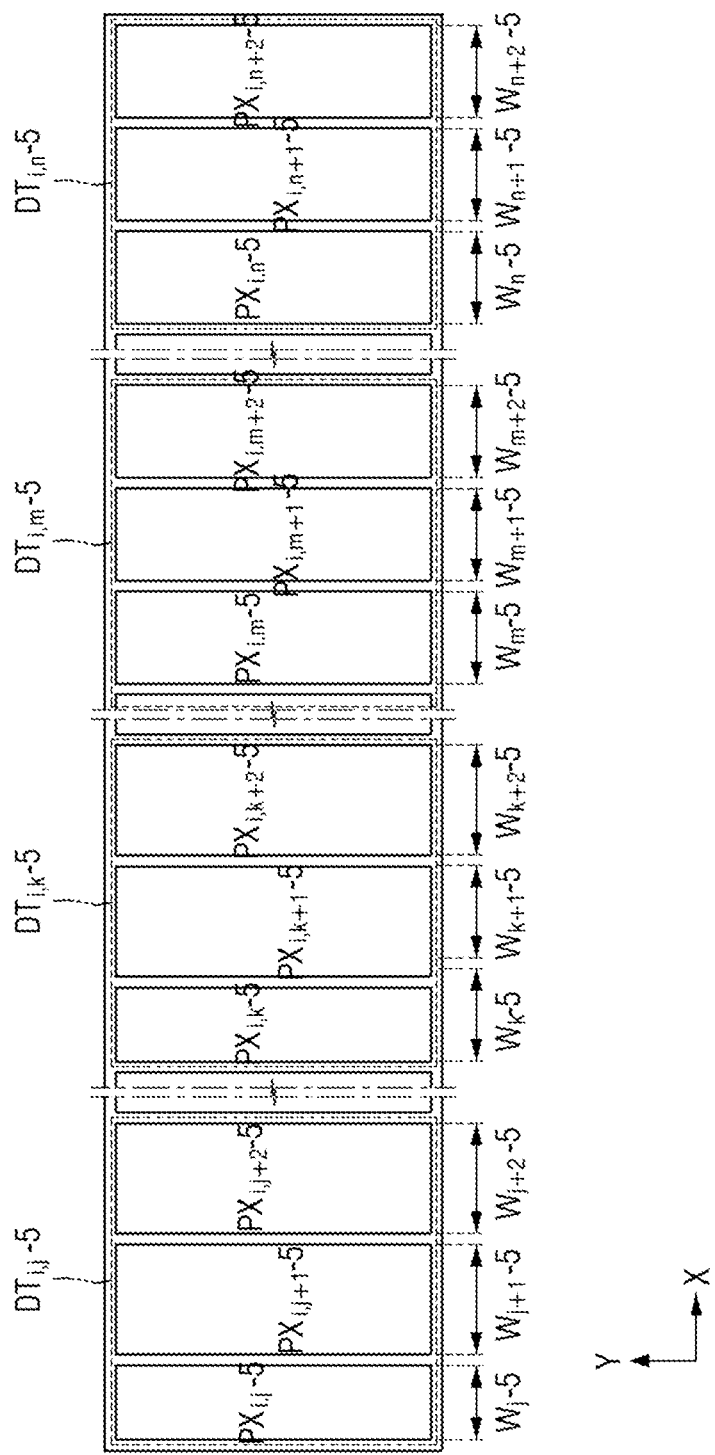
FIG. 20 is an enlarged plan view of a region 'XX' of FIG. 19.
Figure 21:
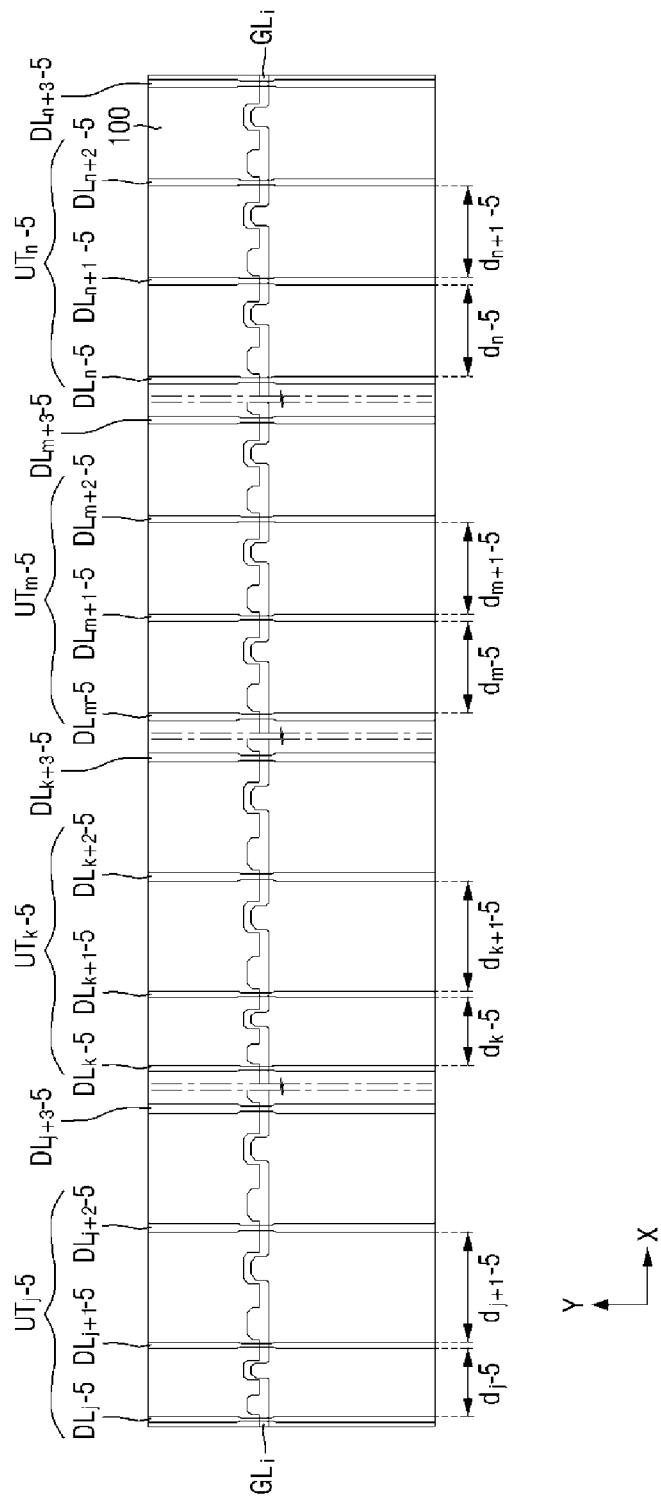
FIG. 21 is an enlarged plan view obtained by removing some elements from FIG. 20.

FIG. 19 is a schematic block diagram of a display area DA-5 of an LCD according to another embodiment of the invention. FIG. 20 is an enlarged plan view of a region 'XX' of FIG. 19. FIG. 21 is an enlarged plan view obtained by removing some elements from FIG. 20.

Referring to FIG. 19, the display area DA-5 according to the current embodiment may be divided into a first region $R_1$-5 and a second region $R_2$-5 by a virtual central line C that passes through a central point of the LCD and extends along the second direction Y. In an exemplary embodiment, the first region $R_1$-5 and the second region $R_2$-5 may be a left half plane and a right half plane of a landscape-type LCD, respectively.

In addition, the first region $R_1$-5 may be divided into a $(1\_1)^{th}$ region $R_3$-5 and a $(1\_2)^{th}$ region $R_4$-5 by a virtual reference line C' that passes through an arbitrary point in the first region $R_1$-5 and extends along the second direction Y. The $(1\_1)^{th}$ region $R_3$-5 may be located further away from the central line C than the $(1\_2)^{th}$ region $R_4$-5.

A ratio of the areas of the $(1\_1)^{th}$ region $R_3$-5 and the $(1\_2)^{th}$ region $R_4$-5 separated by the reference line C' may range from 1:4 to 1:1, for example. However, the invention is not limited thereto. In an exemplary embodiment, the reference line C' may bisect the first region $R_1$-5 such that the ratio of the area of the $(1\_1)^{th}$ region $R_3$-5 and the area of the $(1\_2)^{th}$ region $R_4$-5 is 1:2, for example. A plurality of dots in the $(1\_1)^{th}$ region $R_3$-5 and the $(1\_2)^{th}$ region $R_4$-5 will now be compared and described in detail.

Referring to FIG. 20, pixels repeatedly arranged along the first direction X may form one row of a matrix of pixels. In this case, the pixels repeatedly arranged along the first direction X may include three pixels displaying three different colors as a basic unit, and the basic unit may be repeated along the first direction X. In an exemplary embodiment, a red pixel, a green pixel and a blue pixel may form a basic unit, and the basic unit may be repeated, for example. Three adjacent pixels ($PX_{i,j}$-5, $PX_{i,j+1}$-5 and $PX_{i,j+2}$-5) that form a basic unit define one dot ($DT_{i,j}$-5).

The pixels repeatedly arranged along the first direction X may include a first pixel $PX_{i,j}$-5 of a first dot $DT_{i,j}$-5, a second pixel $PX_{i,j+1}$-5 of the first dot $DT_{i,j}$-5, a third pixel $PX_{i,j+2}$-5 of the first dot $DT_{i,j}$-5, a first pixel $PX_{i,k}$-5 of a second dot $DT_{i,k}$-5, a second pixel $PX_{i,k+1}$-5 of the second dot $DT_{i,k}$-5, a third pixel $PX_{i,k+2}$-5 of the second dot $DT_{i,k}$-5, a first pixel $PX_{i,m}$-5 of a third dot $DT_{i,m}$-5, a second pixel $PX_{i,m+1}$-5 of the third dot $DT_{i,m}$-5, a third pixel $PX_{i,m+2}$-5 of the third dot $DT_{i,m}$-5, a first pixel $PX_{i,n}$-5 of a fourth dot $DT_{i,n}$-5, a second pixel $PX_{i,n+1}$-5 of the fourth dot $DT_{i,n}$-5, and a third pixel $PX_{i,n+2}$-5 of the fourth dot $DT_{i,n}$-5. The first pixels $PX_{i,j}$-5, $PX_{i,k}$-5, $PX_{i,m}$-5 and $PX_{i,n}$-5 of the first, second, third and fourth dots $DT_{i,j}$-5, $DT_{i,k}$-5, $DT_{i,m}$-5 and $DT_{i,n}$-5 display the same color, the second pixels $PX_{i,j+1}$-5, $PX_{i,k+1}$-5, $PX_{i,m+1}$-5 and $PX_{i,n+1}$-5 of the first, second, third and fourth dots $DT_{i,j}$-5, $DT_{i,k}$-5, $DT_{i,m}$-5 and $DT_{i,n}$-5 display the same color, and the third pixels $PX_{i,j+2}$-5, $PX_{i,k+2}$-5, $PX_{i,m+2}$-5 and $PX_{i,n+2}$-5 of the first, second, third and fourth dots $DT_{i,j}$-5, $DT_{i,k}$-5, $DT_{i,m}$-5 and $DT_{i,n}$-5 display the same color. In addition, i and j are integers greater than zero, k is an integer greater than j, m is an integer greater than k, and n is an integer greater than m.

The first dot $DT_{i,j}$-5 and the second dot $DT_{i,k}$-5 may be located in the $(1\_1)^{th}$ region $R_3$-5, and the third dot $DT_{i,m}$-5 and the fourth dot $DT_{i,n}$-5 may be located in the $(1\_2)^{th}$ region $R_4$-5. In addition, a distance between the first pixel $PX_{i,j}$-5 of the first dot $DT_{i,j}$-5 and the central line C in the first direction X is greater than a distance between the first pixel $PX_{i,k}$-5 of the second dot $DT_{i,k}$-5 and the central line C in the first direction X. A distance between the first pixel $PX_{i,m}$-5 of the third dot $DT_{i,m}$-5 and the central line C in the first direction X is greater than a distance between the first pixel $PX_{i,n}$-5 of the fourth dot $DT_{i,n}$-5 and the central line C in the first direction X. That is, in the first region $R_1$-5 (left half plane) of the display area DA-5, the first pixel $PX_{i,j}$-5 of the first dot $DT_{i,j}$-5 may be located further to the left than the first pixel $PX_{i,k}$-5 of the second dot $DT_{i,k}$-5, the first pixel $PX_{i,k}$-5 of the second dot $DT_{i,k}$-5 may be located further to the left than the first pixel $PX_{i,m}$-5 of the third dot $DT_{i,m}$-5, and the first pixel $PX_{i,m}$-5 of the third dot $DT_{i,m}$-5 may be located further to the left than the first pixel $PX_{i,n}$-5 of the fourth dot $DT_{i,n}$-5.

The areas and shapes of the first through third pixels $PX_{i,j}$-5 through $PX_{i,j+2}$-5 of the first dot $DT_{i,j}$-5 may be substantially the same as those of the first through third pixels $PX_{i,k}$-5 through $PX_{i,k+2}$-5 of the second dot $DT_{i,k}$-5, respectively. The areas and shapes of the first through third pixels $PX_{i,m}$-5 through $PX_{i,m+2}$-5 of the third dot $DT_{i,m}$-5 may be substantially the same as those of the first through third pixels $PX_{i,n}$-5 through $PX_{i,n+2}$-5 of the fourth dot $DT_{i,n}$-5, respectively. In addition, the areas and shapes of all pixels included in the $(1\_1)^{th}$ region $R_3$-5 may be substantially the same as those of the first through third pixels $PX_{i,j}$-5 through $PX_{i,j+2}$-5 of the first dot $DT_{i,j}$-5 and those of the first through third pixels $PX_{i,k}$-5 through $PX_{i,k+2}$-5 of the second dot $DT_{i,k}$-5, respectively. The areas and shapes of all pixels included in the $(1\_2)^{th}$ region $R_4$-5 may be substantially the same as those of the first through third pixels $PX_{i,m}$-5 through $PX_{i,m+2}$-5 of the third dot $DT_{i,m}$-5 and those of the first through third pixels $PX_{i,n}$-5 through $PX_{i,n+2}$-5 of the fourth dot $DT_{i,n}$-5, respectively.

The area of the first pixel $PX_{i,k}$-5 of the second dot $DT_{i,k}$-5 is less than that of the first pixel $PX_{i,m}$-5 of the third dot $DT_{i,m}$-5. Since the area of the second dot $DT_{i,k}$-5 is substantially equal to that of the third dot $DT_{i,m}$-5, the sum of the area of the second pixel $PX_{i,k+1}$-5 of the second dot $DT_{i,k}$-5 and the area of the third pixel $PX_{i,k+2}$-5 of the second dot $DT_{i,k}$-5 is greater than the sum of the area of the second pixel $PX_{i,m+1}$-5 of the third dot $DT_{i,m}$-5 and the area of the third pixel $PX_{i,m+2}$-5 of the third dot $DT_{i,m}$-5.

In an exemplary embodiment, the first through third pixels $PX_{i,j}$-5 through $PX_{i,j+2}$-5 of the first dot $DT_{i,j}$-5, the first through third pixels $PX_{i,k}$-5 through $PX_{i,k+2}$-5 of the second dot $DT_{i,k}$-5, the first through third pixels $PX_{i,m}$-5 through $PX_{i,m+2}$-5 of the third dot $DT_{i,m}$-5 and the first through third pixels $PX_{i,n}$-5 through $PX_{i,n+2}$-5 of the fourth dot $DT_{i,n}$-5 may have equal vertical lengths. However, a horizontal length $W_j$-5 of the first pixel $PX_{i,j}$-5 of the first dot $DT_{i,j}$-5 may be equal to a horizontal length $W_k$-5 of the first pixel $PX_{i,k}$-5 of the second dot $DT_{i,k}$-5, the horizontal length $W_k$-5 of the first pixel $PX_{i,k}$-5 of the second dot $DT_{i,k}$-5 may be less than a horizontal length $W_m$-5 of the first pixel $PX_{i,m}$-5 of the third dot $DT_{i,m}$-5, and the horizontal length $W_m$-5 of the first pixel $PX_{i,m}$-5 of the third dot $DT_{i,m}$-5 may be equal to a horizontal length $w_n$-5 of the first pixel $PX_{i,n}$-5 of the fourth dot $DT_{i,n}$-5. In addition, the sum of horizontal lengths $W_{k+1}$-5 and $W_{k+2}$-5 of the second and third pixels $PX_{i,k+1}$-5 and $PX_{i,k+2}$-5 of the second dot $DT_{i,k}$-5 may be greater than the sum of horizontal lengths $W_{m+1}$-5 and $W_{m+2}$-5 of the second and third pixels $PX_{i,m+1}$-5 and $PX_{i,m+2}$-5 of the third dot $DT_{i,m}$-5.

The area of the first pixel $PX_{i,k}$-5 of the second dot $DT_{i,k}$-5 is less than those of the second and third pixels $PX_{i,k+1}$-5 and $PX_{i,k+2}$-5 of the second dot $DT_{i,k}$-5. In addition, the area of the second pixel $PX_{i,k+1}$-5 of the second dot $DT_{i,k}$-5 is substantially equal to that of the third pixel $PX_{i,k+2}$-5 of the second dot $DT_{i,k}$-5.

In an exemplary embodiment, the first through third pixels $PX_{i,k}$-5 through $PX_{i,k+2}$-5 of the second dot $DT_{i,k}$-5 may have equal vertical lengths. However, a ratio of the horizontal length $W_{k-}$-5 of the first pixel $PX_{i,k}$-5 of the second dot $DT_{i,k}$-5 and the horizontal length $W_{k+1}$-5 of the second pixel $PX_{i,k+1}$-5 of the second dot $DT_k$-5 may range from 1:3 to less than 1:1, for example. In addition, the horizontal length $W_{k+1}$-5 of the second pixel $PX_{i,k+1}$-5 of the second dot $DT_{i,k}$-5 may be equal to the horizontal length $W_{k+2}$-5 of the third pixel $PX_{i,k+2}$-5 of the second dot $DT_{i,k}$-5.

Referring to FIG. 21, a plurality of data lines ($DL_j$-5 through $DL_{n+3}$-5) extend parallel to each other along the second direction Y and are repeatedly arranged along the first direction X. Here, each data line may be electrically connected to a corresponding pixel. The pixel may be located on the right side of the corresponding data line.

In the data lines ($DL_j$-5 through $DL_{n+3}$-5) according to the current embodiment, a first data line, a second data line and a third data line sequentially adjacent to each other may form a basic unit, and the basic unit may be repeated along the first direction X. A first basic unit $UT_j$-5 may sequentially include a first data line $DL_j$-5 which is electrically connected to the first pixel $PX_{i,j}$-5 displaying red in the first dot $DT_{i,j}$-5, a second data line $DL_{j+1}$-5 which is electrically connected to the second pixel $PX_{i,j+1}$-5 displaying green in the first dot $DT_{i,j}$-5, and a third data line $DL_{j+2}$-5 which is electrically connected to the third pixel $PX_{i,j+2}$-5 displaying blue in the first dot $DT_{i,j}$-5. In addition, a second basic unit $UT_k$-5 may sequentially include a first data line $DL_k$-5 which is electrically connected to the first pixel $PX_{i,k}$-5 of the second dot $DT_{i,k}$-5, a second data line $DL_{k+1}$-5 which is electrically connected to the second pixel $PX_{i,k+1}$-5 of the second dot $DT_{i,k}$-5, and a third data line $DL_{k+2}$-5 which is electrically connected to the third pixel $PX_{i,k+2}$-5 of the second dot $DT_{i,k}$-5. Further, a third basic unit $UT_m$-5 may sequentially include a first data line $DL_m$-5 which is electrically connected to the first pixel $PX_{i,m}$-5 of the third dot $DT_{i,m}$-5, a second data line $DL_{m+1}$-5 which is electrically connected to the second pixel $PX_{i,m+1}$-5 of the third dot $DT_{i,m}$-5, and a third data line $DL_{m+2}$-5 which is electrically connected to the third pixel $PX_{i,m+2}$-5 of the third dot $DT_{i,m}$-5. A fourth basic unit $UT_n$-5 may sequentially include a first data line $DL_n$-5 which is electrically connected to the first pixel $PX_{i,n}$-5 of the fourth dot $DT_{i,n}$-5, a second data line $DL_{n+1}$-5 which is electrically connected to the second pixel $PX_{i,n+1}$-5 of the fourth dot $DT_{i,n}$-5, and a third data line $DL_{n+2}$-5 which is electrically connected to the third pixel $PX_{i,n+2}$-5 of the fourth dot $DT_{i,n}$-5.

Distances between and shapes of the first through third data lines $DL_j$-5 through $DL_{j+2}$-5 of the first basic unit $UT_A$-5 may be substantially the same as distances between and shapes of the first through third data lines $DL_k$-5 through $DL_{k+2}$-5 of the second basic unit $UT_k$-5. Distances between and shapes of the first through third data lines $DL_m$-5 through $DL_{m+2}$-5 of the third basic unit $UT_m$-5 may be substantially the same as distances between and shapes of the first through third data lines $DL_n$-5 through $DL_{n+2}$-5 of the fourth basic unit $UT_n$-5.

A distance $d_k$-5 between the first data line $DL_k$-5 of the second basic unit $UT_k$-5 and the second data line $DL_{k+1}$-5 of the second basic unit $UT_k$-5 is less than a distance $d_m$-5 between the first data line $DL_m$-5 of the third basic unit $UT_m$-5 and the second data line $DL_{m+1}$-5 of the third basic unit $UT_m$-5. In addition, a distance $d_{k+1}$-5 between the second data line $DL_{k+1}$-5 of the second basic unit $UT_k$-5 and the third data line $DL_{k+2}$-5 of the second basic unit $UT_k$-5 is greater than a distance $d_{m+1}$-5 between the second data line $DL_{m+1}$-5 of the third basic unit $UT_m$-5 and the third data line $DL_{m+2}$-5 of the third basic unit $UT_m$-5.

In an exemplary embodiment, a horizontal length of the second basic unit $UT_k$-5 may be substantially equal to a horizontal length of the third basic unit $UT_m$-5. In addition, a ratio of the distance $d_k$-5 between the first data line $DL_k$-5 of the second basic unit $UT_k$-5 and the second data line $DL_{k+1}$-5 of the second basic unit $UT_k$-5 and the distance $d_m$-5 between the first data line $DL_m$-5 of the third basic unit $UT_m$-5 and the second data line $DL_{m+1}$-5 of the third basic unit $UT_m$-5 may range from 1:2 to less than 1:1, for example.

The distance $d_k$-5 between the first data line $DL_k$-5 of the second basic unit $UT_k$-5 and the second data line $DL_{k+1}$-5 of the second basic unit $UT_k$-5 is less than the distance $d_{k+1}$-5 between the second data line $DL_{k+1}$-5 of the second basic unit $UT_k$-5 and the third data line $DL_{k+2}$-5 of the second basic unit $UT_k$-5.

In an exemplary embodiment, a ratio of the distance $d_k$-5 between the first data line $DL_k$-5 of the second basic unit $UT_k$-5 and the second data line $DL_{k+1}$-5 of the second basic unit $UT_k$-5 and the distance $d_{kA}$-5 between the second data line $DL_{k+1}$-5 of the second basic unit $UT_k$-5 and the third data line $DL_{k+2}$-5 of the second basic unit $UT_k$-5 may range from 1:3 to less than 1:1, for example.

If a plurality of pixels and a plurality of data lines in the first region $R_1$-5 of the display area DA-5 according to the current embodiment are configured as described above, the areas of first pixels displaying red may be maintained constant from a central part of the display area DA-4 toward both side edges of the display area DA-4 in the first direction X. In addition, the areas of the first pixels may be reduced and maintained constant at the reduced areas from a location corresponding to one sixth of a side of the display area DA-5 in the first direction X from the central part of the display area DA-5 and from a location corresponding to one sixth of the other side of the display area DA-5 in the first direction X from the central part of the display area DA-5. As a result, the reddish phenomenon that occurs at a location where the misalignment of liquid crystal molecules is at a maximum according to curvature may be reduced without a substantial reduction in aperture ratio.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

Embodiments of the invention provide at least one of the following advantages.

The reddish phenomenon of an LCD according to an exemplary embodiment of the invention may be reduced.

However, the effects of the invention are not restricted to the one set forth herein. The above and other effects of the invention will become more apparent to one of daily skill in the art to which the invention pertains by referencing the claims.

What is claimed is:

1. A liquid crystal display which is divided into a first region and a second region by a virtual central line which passes through a central point of the liquid crystal display and extends along a first direction, wherein the first region comprises a plurality of dots, each comprising a first pixel, a second pixel and a third pixel displaying different colors, wherein the plurality of dots is repeatedly arranged along a second direction intersecting the first direction and comprise a first dot and a second dot, wherein a first distance between the first pixel of the first dot and the central line is greater than a second distance between the first pixel of the second dot and the central line, and an area of the first pixel of the first dot is less than that of the first pixel of the second dot,
   wherein an area of the second pixel of the first dot is greater than that of the first pixel of the first dot.

2. The liquid crystal display of claim 1, wherein a maximum value of the first distance is two thirds of a length of the first region in the second direction.

3. The liquid crystal display of claim 1, wherein a minimum value of the first distance is two thirds of a length of the first region in the second direction.

4. The liquid crystal display of claim 3, wherein a maximum value of the second distance is two thirds of the length of the first region in the second direction.

5. A liquid crystal display which is divided into a first region and a second region by a virtual central line which passes through a central point of the liquid crystal display and extends along a first direction, wherein the first region comprises a plurality of dots, each comprising a first pixel, a second pixel and a third pixel displaying different colors, wherein the plurality of dots is repeatedly arranged along a second direction intersecting the first direction and comprise a first dot and a second dot, wherein a first distance between the first pixel of the first dot and the central line is greater than a second distance between the first pixel of the second dot and the central line, and an area of the first pixel of the first dot is less than that of the first pixel of the second dot,
   wherein an area of the first dot is equal to that of the second dot.

6. The liquid crystal display of claim 5, wherein a length of the first pixel of the first dot in the first direction is equal to a length of the first pixel of the second dot in the first direction.

7. The liquid crystal display of claim 6, wherein a ratio of the area of the first pixel of the first dot and an area of the second pixel of the first dot ranges from 1:2 to less than 1:1.

8. The liquid crystal display of claim 7, wherein the area of the second pixel of the first dot is equal to that of the third pixel of the first dot.

9. The liquid crystal display of claim 7, wherein a ratio of the area of the first pixel of the first dot and the area of the first pixel of the second dot ranges from 3:5 to less than 1:1.

10. The liquid crystal display of claim 1, wherein a color displayed by the first pixel has a longer wavelength than that of a color displayed by the second pixel, and the color displayed by the second pixel has a longer wavelength than that of a color displayed by the third pixel.

11. The liquid crystal display of claim 10, wherein each of the plurality of dots repeatedly arranged along the second direction comprises three pixels as a basic unit, wherein the basic unit sequentially comprises a red pixel displaying red, a green pixel displaying green and a blue pixel displaying blue or a red pixel displaying red, a blue pixel displaying blue and a green pixel displaying green.

12. The liquid crystal display of claim 1, wherein the liquid crystal display includes at least one of a curved part or a flexible part.

13. A liquid crystal display comprising:
a first substrate;
a second substrate which faces the first substrate; and
a plurality of data lines which are disposed on the first substrate and extend along a first direction,
wherein the liquid crystal display is divided into a first region and a second region by a virtual central line which passes through a central point of the liquid crystal display and extends along the first direction, and at least a portion of the data lines are provided in the first region, wherein the data lines provided in the first region comprise a first data line, a second data line and a third data line sequentially adjacent to each other as a basic unit, and the basic unit is repeated along a second direction intersecting the first direction, wherein the basic units comprise a first basic unit and a second basic unit, wherein a first distance between the first data line of the first basic unit and the central line is greater than a second distance between the first data line of the second basic unit and the central line, and a distance between the first data line of the first basic unit and the second data line of the first basic unit is less than a distance between the first data line of the second basic unit and the second data line of the second basic unit,
wherein a width of each of the basic units repeated along the second direction in the first and second regions are the same.

14. The liquid crystal display of claim 13, wherein a maximum value of the first distance is two thirds of a length of the first region in the second direction.

15. The liquid crystal display of claim 13, wherein a minimum value of the first distance is two thirds of a length of the first region in the second direction.

16. The liquid crystal display of claim 15, wherein a maximum value of the second distance is two thirds of the length of the first region in the second direction.

17. The liquid crystal display of claim 13, wherein a ratio of the distance between the first data line of the first basic unit and the second data line of the first basic unit and a distance between the second data line of the first basic unit and the third data line of the first basic unit ranges from 1:2 to less than 1:1.

18. The liquid crystal display of claim 17, wherein a ratio of the distance between the first data line of the first basic unit and the second data line of the first basic unit and the distance between the first data line of the second basic unit and the second data line of the second basic unit ranges from 3:5 to less than 1:1.

19. The liquid crystal display of claim 13, wherein the first data line of each basic unit is electrically connected to a red pixel displaying red.

20. The liquid crystal display of claim 13, wherein the second data line of each basic unit is electrically connected to a red pixel displaying red.

* * * * *